US 12,076,815 B2

(12) United States Patent
Shimbori et al.

(10) Patent No.: US 12,076,815 B2
(45) Date of Patent: Sep. 3, 2024

(54) LASER PROCESSING APPARATUS AND METHOD FOR PROCESSING WORKPIECE

(71) Applicant: Gigaphoton Inc., Tochigi (JP)

(72) Inventors: Masashi Shimbori, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 678 days.

(21) Appl. No.: 17/307,252

(22) Filed: May 4, 2021

(65) Prior Publication Data

US 2021/0252634 A1    Aug. 19, 2021

Related U.S. Application Data

(63) Continuation of application No. PCT/JP2018/045811, filed on Dec. 13, 2018.

(51) Int. Cl.
*B23K 26/073* (2006.01)
*B23K 26/06* (2014.01)
(Continued)

(52) U.S. Cl.
CPC ........ *B23K 26/073* (2013.01); *B23K 26/0622* (2015.10); *B23K 26/0648* (2013.01); *B23K 26/066* (2015.10); *B23K 26/082* (2015.10)

(58) Field of Classification Search
CPC .............. B23K 26/073; B23K 26/0622; B23K 26/0648; B23K 26/066; B23K 26/082; B23K 2101/42; G02B 27/09; H01S 3/00
See application file for complete search history.

(56) References Cited

U.S. PATENT DOCUMENTS 6,285,855 B1    9/2001  Tsuji
2004/0125459 A1*  7/2004  Tanitsu ............... G03F 7/70091
                                              359/708
(Continued)

FOREIGN PATENT DOCUMENTS

JP        S63-52786 A     3/1988
JP        H04-238686 A    8/1992
(Continued)

OTHER PUBLICATIONS

International Search Report issued in PCT/JP2018/045811; mailed Mar. 12, 2019.
(Continued)

*Primary Examiner* — Robert G Bachner
(74) *Attorney, Agent, or Firm* — Studebaker & Brackett PC

(57) ABSTRACT

A laser processing apparatus includes a placement base on which a workpiece is placed, a beam shaping optical system that shapes laser light such that a first laser light irradiated region of a mask blocking part of the laser light has a rectangular shape having short edges and long edges, the beam shaping optical system capable of causing one of a first radiation width of the first irradiated region in the direction parallel to the short edges and a second radiation width of the first irradiated region in the direction parallel to the long edges to be fixed and causing the other to be changed, a projection optical system that projects a pattern on the mask onto the workpiece, and a mover that moves the first irradiated region at least in the direction parallel to the short edges to move a second laser light irradiated region of the workpiece.

11 Claims, 17 Drawing Sheets

(51) Int. Cl.
    *B23K 26/0622*    (2014.01)
    *B23K 26/066*     (2014.01)
    *B23K 26/082*     (2014.01)

(56) References Cited

U.S. PATENT DOCUMENTS

| | | |
|---|---|---|
| 2010/0027570 A1 | 2/2010 | Lizotte et al. |
| 2011/0228537 A1 | 9/2011 | Yoshimizu et al. |
| 2019/0283179 A1 | 9/2019 | Kakizaki et al. |

FOREIGN PATENT DOCUMENTS

| | | |
|---|---|---|
| JP | H06-177009 A | 6/1994 |
| JP | H10-270312 A | 10/1998 |
| JP | 2001-135560 A | 5/2001 |
| JP | 2002-118043 A | 4/2002 |
| JP | 2002-207167 A | 7/2002 |
| JP | 2008-147337 A | 6/2008 |
| JP | 2011-216863 A | 10/2011 |
| WO | 2018/100638 A1 | 6/2018 |

OTHER PUBLICATIONS

International Preliminary Report on Patentability (Chapter I) and Written Opinion of the International Searching Authority issued in PCT/JP2018/045811; issued Jun. 8, 2021.

\* cited by examiner

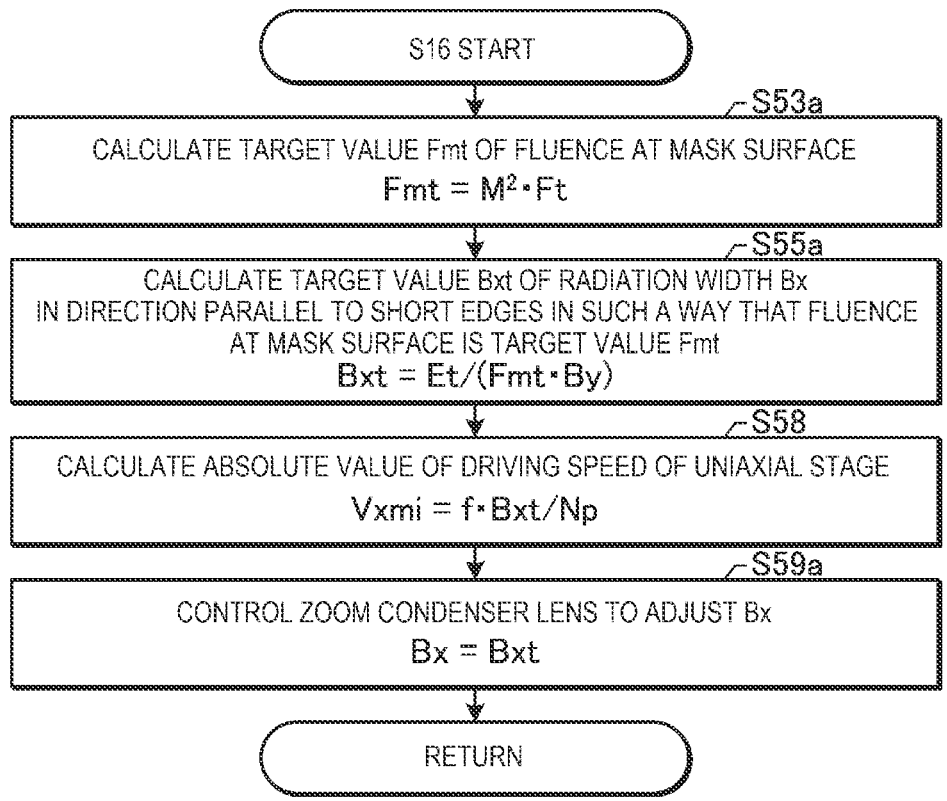

FIG. 9

(FIRST EMBODIMENT)

S16 START

S53a: CALCULATE TARGET VALUE Fmt OF FLUENCE AT MASK SURFACE
$Fmt = M^2 \cdot Ft$ S55a: CALCULATE TARGET VALUE Bxt OF RADIATION WIDTH Bx IN DIRECTION PARALLEL TO SHORT EDGES IN SUCH A WAY THAT FLUENCE AT MASK SURFACE IS TARGET VALUE Fmt
$Bxt = Et/(Fmt \cdot By)$ S58: CALCULATE ABSOLUTE VALUE OF DRIVING SPEED OF UNIAXIAL STAGE
$Vxmi = f \cdot Bxt/Np$ S59a: CONTROL ZOOM CONDENSER LENS TO ADJUST Bx
$Bx = Bxt$

RETURN

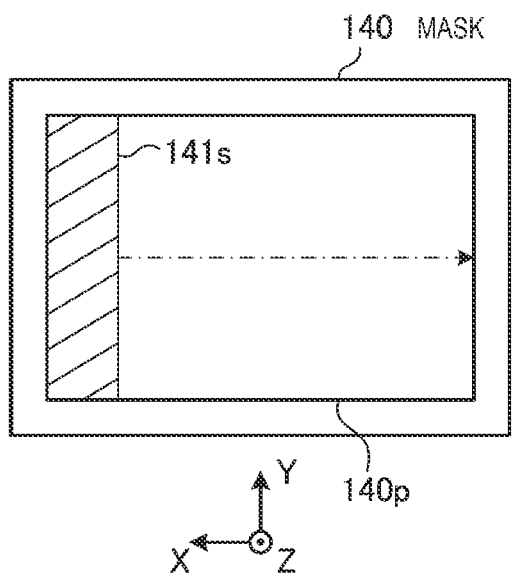

FIG. 10A

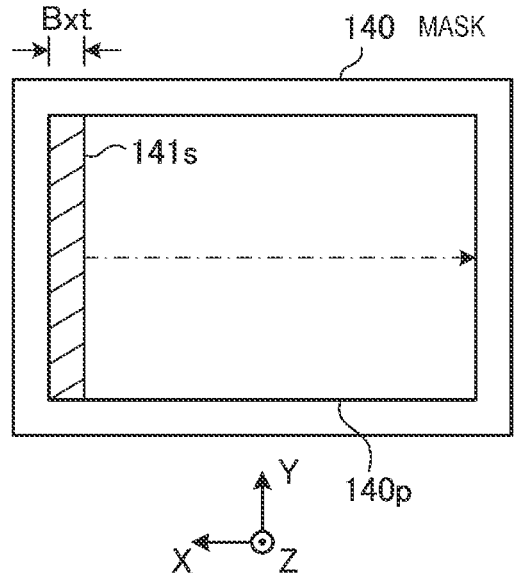

FIG. 10B

FIG. 11A
FIG. 11B
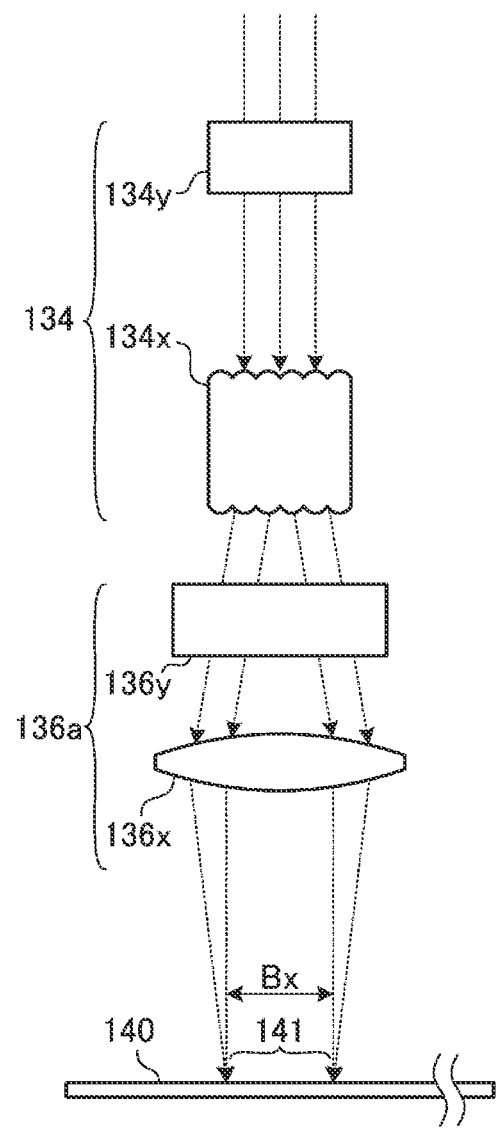
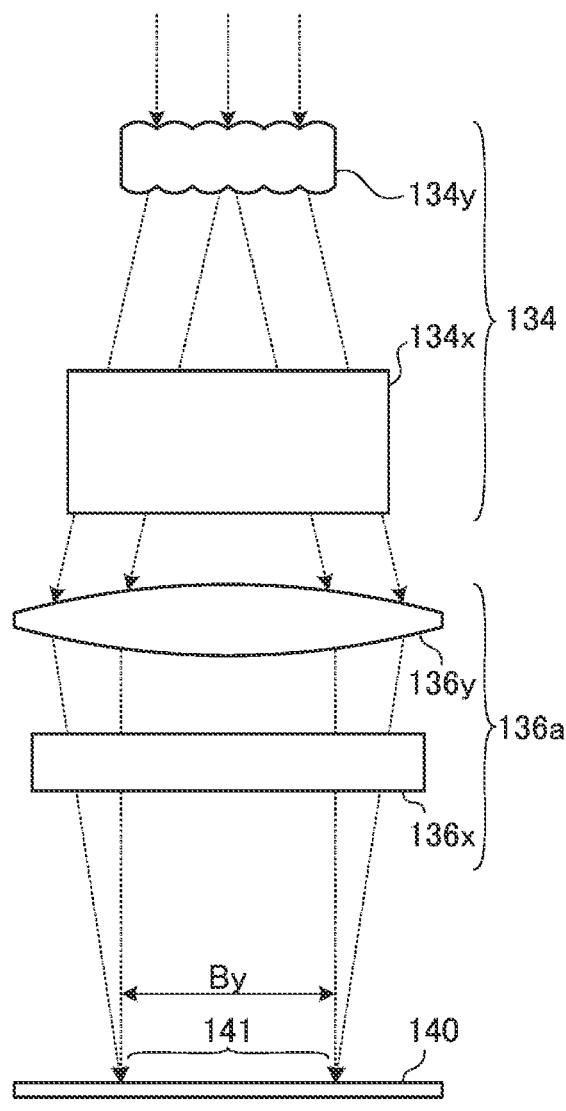

FIG. 12A
FIG. 12B
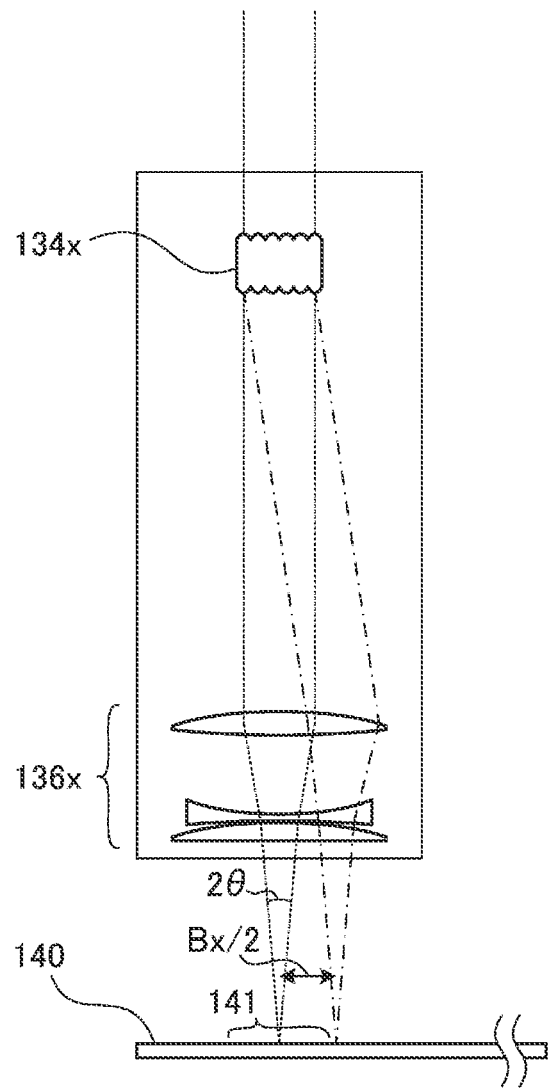
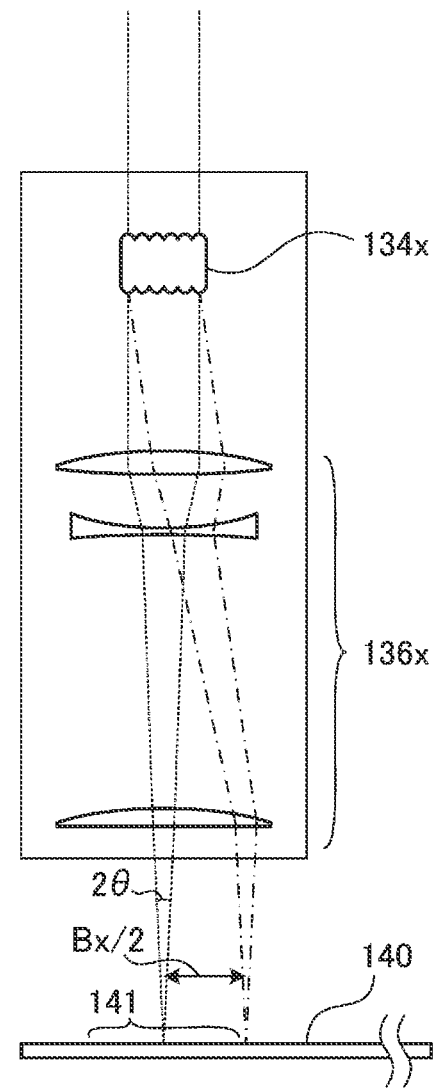

LASER PROCESSING APPARATUS AND METHOD FOR PROCESSING WORKPIECE

CROSS-REFERENCE TO RELATED APPLICATIONS

The present application is a continuation application of International Application No. PCT/JP2018/045811, filed on Dec. 13, 2018, the entire contents of which are hereby incorporated by reference.

BACKGROUND

1. Technical Field

The present disclosure relates to a laser processing apparatus and a method for processing a workpiece.

2. Related Art

In recent years, a semiconductor exposure apparatus (hereinafter referred to as "exposure apparatus") is required to improve the resolution thereof as a semiconductor integrated circuit is increasingly miniaturized and highly integrated. To this end, reduction in the wavelength of the light outputted from a light source for exposure is underway. A gas laser apparatus is generally used as the light source for exposure in place of a mercury lamp in related art. For example, a KrF excimer laser apparatus, which outputs ultraviolet laser light having a wavelength of 248 nm, and an ArF excimer laser apparatus, which outputs ultraviolet laser light having a wavelength of 193 nm, are used as the gas laser apparatus for exposure.

The excimer laser light, which has a pulse width of about several tens of nanoseconds and has the short wavelength of 248.4 nm or 193.4 nm, is used in some cases to directly process a polymer material, a glass material, and other materials.

The excimer laser light having photon energy higher than the chemical binding energy of a polymer material can unbind the chemically bonded molecules that form the polymer material. Unheated processing can therefore be performed on a polymer material by using excimer laser light, and it is known that an excellent processed shape is achieved by the unheated processing.

Glass, ceramic, and other materials absorb excimer laser light by a large amount, and it is therefore known that excimer laser light can process a material difficult to process with visible or infrared laser light.

CITATION LIST

Patent Literature

[PTL 1] JP-A-2001-135560
[PTL 2] JP-A-2008-147337

SUMMARY

A laser processing apparatus according to a viewpoint of the present disclosure includes a placement base on which a workpiece is placed, a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of causing one of a first radiation width of the first irradiated region in a direction parallel to the short edges and a second radiation width of the first irradiated region in a direction parallel to the long edges to be fixed and causing another of the first and second radiation widths to be changed, a projection optical system configured to project a pattern on the mask onto the workpiece placed on the placement base, and a mover configured to move the first irradiated region at least in the direction parallel to the short edges to move a second irradiated region of the workpiece placed on the placement base that is a region irradiated with the laser light.

A laser processing apparatus according to another viewpoint of the present disclosure includes a placement base on which a workpiece is placed, a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of independently changing a first radiation width of the first irradiated region in a direction parallel to the short edges and a second radiation width of the first irradiated region in a direction parallel to the long edges, a projection optical system configured to project a pattern on the mask onto the workpiece placed on the placement base, and a mover configured to move the first irradiated region at least in the direction parallel to the short edges to move a second irradiated region of the workpiece placed on the placement base that is a region irradiated with the laser light.

A method for processing a workpiece according to a viewpoint of the present disclosure is a method for processing a workpiece using a laser processing apparatus including a placement base on which a workpiece is placed, a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of causing one of a first radiation width of the first irradiated region in a direction parallel to the short edges and a second radiation width of the first irradiated region in a direction parallel to the long edges to be fixed and causing another of the first and second radiation widths to be changed, a projection optical system configured to project a pattern on the mask onto the workpiece placed on the placement base, and a mover configured to move the first irradiated region at least in the direction parallel to the short edges to move a second irradiated region of the workpiece placed on the placement base that is a region irradiated with the laser light, the method including using the laser processing apparatus to shape the laser light in such a way that the first irradiated region has the rectangular shape, project a pattern on the mask onto the workpiece placed on the placement base, and move the first irradiated region at least in the direction parallel to the short edges.

A method for processing a workpiece according to another viewpoint of the present disclosure is a method for processing a workpiece using a laser processing apparatus including a placement base on which a workpiece is placed, a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of independently changing a first radiation width of the first irradiated region in a direction parallel to the short edges and a second radiation width of the first irradiated region in a direction parallel to the long edges, a projection optical system configured to project a pattern on the mask onto the workpiece placed on the placement base, and a mover configured to move the first irradiated region at least in the direction parallel to the short edges to move a second irradiated region of the workpiece placed on the placement base that is a region irradiated with the laser light, the method including using the laser processing apparatus to shape the laser light in such a way that the first irradiated region has the rectangular shape, project a pattern on the mask onto the workpiece placed on the placement base, and move the first irradiated region at least in the direction parallel to the short edges.

BRIEF DESCRIPTION OF THE DRAWINGS

Embodiments of the present disclosure will be described below only by way of example with reference to the accompanying drawings.

FIG. 9 is a flowchart showing an example of the content of the process of calculating and setting the control parameters for controlling the laser processing apparatus 14, the calculation and setting process carried out in the first embodiment.

FIGS. 10A and 10B are plan views showing an example of the mask 140 irradiated with the laser light in the first embodiment.

FIGS. 11A and 11B show an example of the configurations of a fly-eye lens 134 and a zoom condenser lens 136a.

FIGS. 12A and 12B show examples of the configurations of an X-direction fly-eye lens 134x and an X-direction zoom condenser lens 136x.

DETAILED DESCRIPTION

Contents

Figure 1:
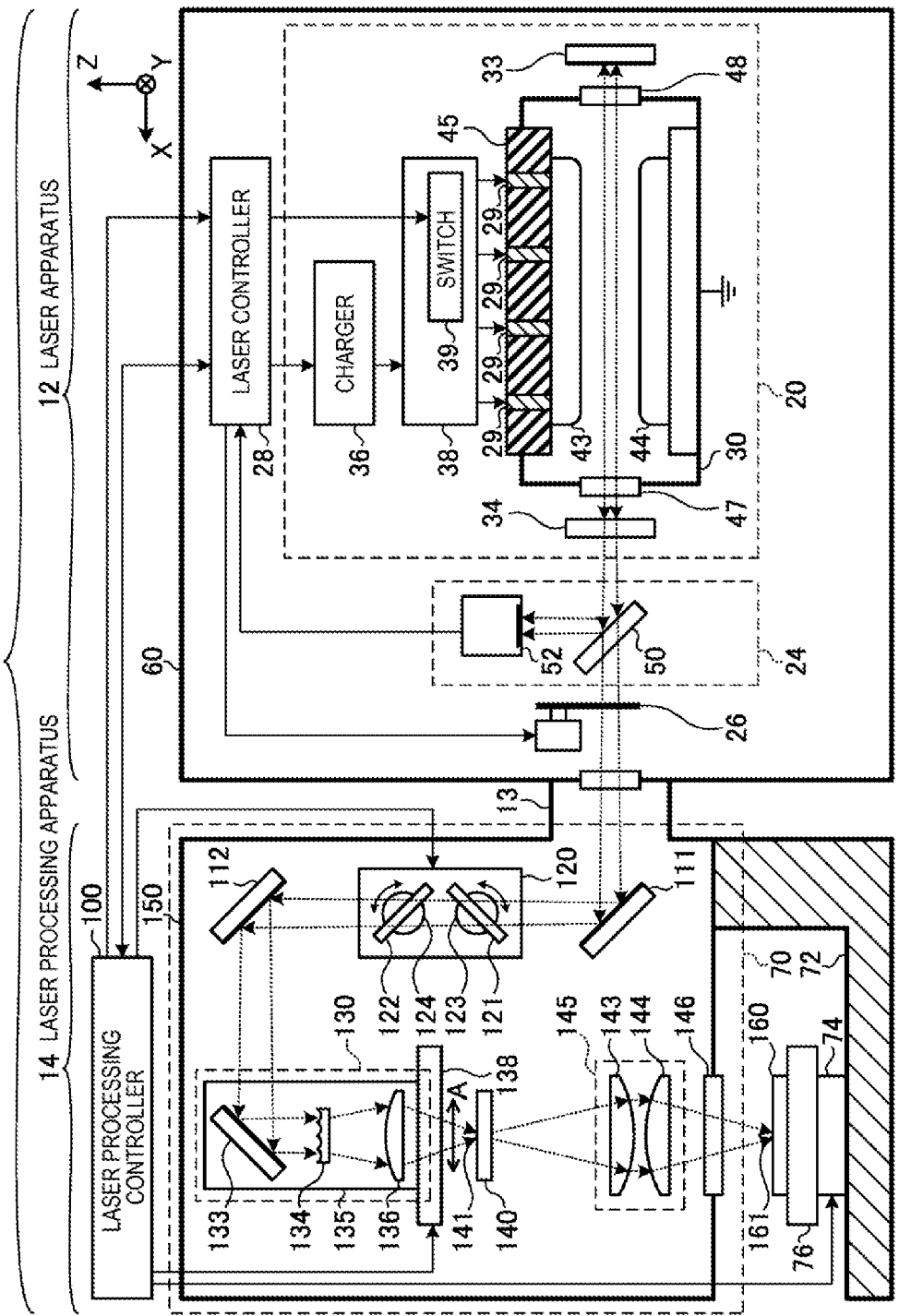
FIG. 1 schematically shows the configuration of a laser processing system 10 including a laser processing apparatus 14 according to Comparable Example.

1. Laser processing apparatus and laser processing system according to Comparable Example
    1.1 Configuration
        1.1.1 Configuration of laser apparatus
        1.1.2 Configuration of laser processing apparatus
    1.2 Operation
        1.2.1 Operation of laser apparatus
        1.2.2 Operation of laser processing apparatus
        1.2.3 Movement of irradiated region of mask
        1.2.4 Movement of irradiated region of workpiece
        1.2.5 Operation of laser processing controller
            1.2.5.1 Main procedure
            1.2.5.2 Details of reading of laser processing condition parameters
            1.2.5.3 Details of calculation and setting of control parameters
            1.2.5.4 Details of beam scan processing
    1.3 Problems
2. Laser processing apparatus capable of independently changing longitudinal and lateral radiation widths
    2.1 Configuration
    2.2 Operation
        2.2.1 Calculation and setting of control parameters
        2.2.2 Movement of irradiated region of mask
    2.3 Effects
    2.4 Example of configuration of beam shaping optical system 3. Laser processing apparatus that matches radiation width with mask width
3.1 Overview
3.2 Operation
3.2.1 Reading of laser processing condition parameters
3.2.2 Calculation and setting of control parameters
3.2.3 Movement of irradiated region of mask
3.3 Effects
4. Laser processing apparatus that scans mask multiple times
4.1 Configuration
4.2 Operation
4.2.1 Reading of laser processing condition parameters
4.2.2 Calculation and setting of control parameters
4.2.3 Beam scan processing
4.2.4 Movement of irradiated region of mask
4.2.5 Movement of irradiated region of workpiece
4.3 Effects
5. Laser processing apparatus capable of enlarging and reducing light that enters beam shaping optical system
5.1 Configuration
5.2 Operation
5.3 Effects
6. Others Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Laser Processing Apparatus and Laser Processing System According to Comparable Example 1.1 Configuration FIG. 1 schematically shows the configuration of a laser processing system 10 including a laser processing apparatus 14 according to Comparable Example. The laser processing system 10 includes a laser apparatus 12, an optical path tube 13, and the laser processing apparatus 14.
1.1.1 Configuration of Laser Apparatus The laser apparatus 12 is a laser apparatus configured to output ultraviolet laser light. For example, the laser apparatus 12 may be a discharge-excitation-type laser apparatus containing $F_2$, ArF, KrF, XeCl, or XeF as the laser medium. The laser apparatus 12 includes an oscillator 20, a monitor module 24, a shutter 26, and a laser controller 28.

The oscillator 20 includes a chamber 30, a rear mirror 33, an output coupling mirror 34, a charger 36, and a pulse power module (PPM) 38. The chamber 30 encapsulates an excimer laser gas.

The chamber 30 includes a pair of electrodes 43 and 44, an insulating member 45, and windows 47 and 48. A plurality of conductive members 29 are buried in the insulating member 45. The electrode 43 is supported by the insulating member 45. The electrode 43 is electrically connected to the pulse power module 38 via the conductive member 29. The electrode 44 is connected to ground potential via a conductive member that forms the chamber 30.

The rear mirror 33 and the output coupling mirror 34 form an optical resonator. The rear mirror 33 is formed of a flat substrate with which a high-reflectance film is coated, and the output coupling mirror 34 is formed of a flat substrate with which a partial reflection film is coated. The chamber 30 is disposed in the optical path of the optical resonator.

The monitor module 24 includes a beam splitter 50 and an optical sensor 52.

The shutter 26 is disposed in the optical path of the laser light having passed through the beam splitter 50.

The optical path of the laser light may be encapsulated by an enclosure 60 and the optical path tube 13 and may be purged with an $N_2$ gas.
1.1.2 Configuration of Laser Processing Apparatus The laser processing apparatus 14 includes a radiation optical system 70, a frame 72, an XYZ stage 74, and a laser processing controller 100.

The radiation optical system 70 and the XYZ stage 74 are fixed to the frame 72. A workpiece 160 is supported by a table 76 of the XYZ stage 74. The table 76 is an example of a placement base on which the workpiece 160 is placed.

The workpiece 160 may, for example, be an interposer substrate that relays an LSI (large-scale integrated circuit) chip and a primary printed board to each other or a flexible printed board. An electrically insulating material of which the substrate is made is, for example, a polymer material, a glass epoxy material, or a glass material.

The radiation optical system 70 includes high-reflectance mirrors 111 and 112, an attenuator 120, a beam shaping optical system 130, a uniaxial stage 138, a mask 140, a projection optical system 145, a window 146, and an enclosure 150.

The high-reflectance mirror 111 is disposed in the optical path of the laser light having passed through the optical path tube 13. The high-reflectance mirror 111 is so disposed that the laser light passes through the attenuator 120 and enters the high-reflectance mirror 112.

The attenuator 120 is disposed in the optical path between the high-reflectance mirror 111 and the high-reflectance mirror 112. The attenuator 120 includes two partial reflection mirrors 121 and 122 and rotary stages 123 and 124. The rotary stages 123 and 124 are configured to be capable of changing the angles of incidence of the laser light incident on the partial reflection mirrors 121 and 122, respectively.

The high-reflectance mirror 112 is so disposed that the laser light having passed through the attenuator 120 enters the beam shaping optical system 130.

The beam shaping optical system 130 includes a high-reflectance mirror 133, a fly-eye lens 134, and a condenser lens 136.

The high-reflectance mirror 133 provided in the beam shaping optical system 130 is so disposed that the laser light incident on the high-reflectance mirror 133 enters the fly-eye lens 134.

The fly-eye lens 134 is so disposed that the focal plane of the fly-eye lens 134 coincides with the front focal plane of the condenser lens 136. The condenser lens 136 is so disposed that the rear focal plane of the condenser lens 136 coincides with the position of the mask 140.

The beam shaping optical system 130 having the configuration described above provides the mask 140 with Koehler illumination.

Figure 2A:
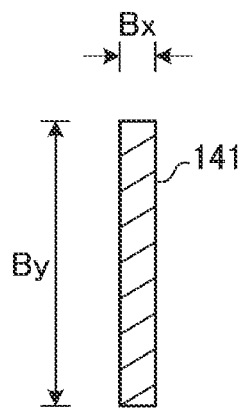
FIG. 2A shows an example of a laser light irradiated region 141 of a mask 140.

FIG. 2A shows an example of a laser light irradiated region 141 of the mask 140. The irradiated region 141 corresponds to a cross section of the optical path of the laser light taken along the surface of the mask 140. The irradiated region 141 corresponds to the first irradiated region in the present disclosure. The irradiated region 141 has a rectangular shape. The rectangular shape has short edges and long edges. The direction parallel to the short edges of the rectangular irradiated region 141 is called an axis-X direction, and the direction parallel to the long edges of the rectangular irradiated region 141 is called an axis-Y direction. Let Bx be a radiation width in the direction parallel to the short edges, and By be a radiation width in the direction parallel to the long edges.

Referring back to FIG. 1, the beam shaping optical system 130 is supported by a plate 135. The plate 135 is so supported by the uniaxial stage 138 as to be movable along with the beam shaping optical system 130 in the axis-X direction indicated by the bidirectional arrow A. When the beam shaping optical system 130 moves in the axis-X direction, the irradiated region 141 moves in the axis-X direction on the mask 140.

The mask 140 is, for example, a mask formed of a synthetic quartz substrate which transmits the excimer laser light, which is ultraviolet light, and on which a pattern formed of a metal or dielectric multilayer film is formed. For example, to form via holes in a printed board as the workpiece 160, a pattern having holes each having a diameter ranging from 5 to 30 μm is formed on the mask 140.

The projection optical system 145 is so disposed as to form an inverted image of the mask 140 on the surface of the workpiece 160. The projection optical system 145 may be a reduction projection optical system formed of a unit lens formed of a plurality of lenses 143 and 144.

The window 146 is disposed in the optical path of the laser light between the projection optical system 145 and the workpiece 160. The window 146 is disposed in a hole provided in the enclosure 150, for example, via an O ring that is not shown. The window 146 may be a substrate made of $CaF_2$ crystal or synthetic quartz substrate, which transmits the excimer laser light, and may be coated with reflection suppression films on opposite sides.

The enclosure 150 may be so sealed, for example, with the O rings that outside air does not enter the enclosure 150 and purged with an $N_2$ gas.

The laser processing controller 100 is configured to control the operation of the attenuator 120, the uniaxial stage 138, and the XYZ stage 74. The laser processing controller 100 is configured to transmit data on target pulse energy Et and output a light emission trigger to the laser apparatus 12.

1.2 Operation 1.2.1 Operation of Laser Apparatus

In the laser apparatus 12, the laser controller 28 is configured to transmit a charging voltage setting signal to the charger 36 based on the data on the target pulse energy Et received from the laser processing controller 100. The laser controller 28 is further configured to transmit a light emission trigger to a switch 39 provided in the pulse power module 38 based on the light emission trigger received from the laser processing controller 100.

The switch 39 of the pulse power module 38 is turned on upon reception of the light emission trigger from the laser controller 28. The pulse power module 38 is configured to generate pulsed high voltage from the electric energy charged in the charger 36 when the switch 39 is turned on. The pulse power module 38 is configured to apply the high voltage to the space between the pair of electrodes 43 and 44.

When the high voltage is applied to the space between the pair of electrodes 43 and 44, discharge occurs between the pair of electrodes 43 and 44. The energy of the discharge excites the laser gas in the chamber 30, and the state of the excited laser gas transitions to a high energy level. Thereafter, when the excited laser gas transitions to a low energy level, the laser gas emits light having a wavelength according to the difference between the energy levels.

The light generated in the chamber 30 exits out of the chamber 30 via the windows 47 and 48. The light having exited via the window 48 of the chamber 30 is reflected off the rear mirror 33 at high reflectance and returns into the chamber 30.

The output coupling mirror 34 is configured to transmit and output part of the light having exited via the window 47 of the chamber 30 and reflect the remaining light back into the chamber 30.

The light having exited out of the chamber 30 thus travels back and forth between the rear mirror 33 and the output coupling mirror 34 and is amplified whenever passing through the discharge space between the pair of electrodes 43 and 44 to achieve laser oscillation. As a result, the laser light exits via the output coupling mirror 34. The laser light is pulsed laser light.

The monitor module 24 is configured to detect the pulse energy of the laser light having exited via the output coupling mirror 34. The monitor module 24 is configured to transmit data on the detected pulse energy to the laser controller 28.

The laser controller 28 is configured to perform feedback control on the charging voltage to be set in the charger 36 based on the data on the measured pulse energy received from the monitor module 24 and the data on the target pulse energy Et received from the laser processing controller 100.

1.2.2 Operation of Laser Processing Apparatus

The XYZ stage 74 is configured to position the table 76 in such a way that the inverted image of the mask 140 is formed in a desired processing target region of the workpiece 160.

The laser light having passed through the beam splitter 50 of the monitor module 24 enters the laser processing apparatus 14 through the optical path tube 13 with the shutter 26 open. The laser light is guided by the radiation optical system 70 to the workpiece 160 as follows.

The laser light having entered the laser processing apparatus 14 is reflected off the high-reflectance mirror 111, passes through the attenuator 120, and is then reflected off the high-reflectance mirror 112 in the axis-X direction.

The laser light reflected off the high-reflectance mirror 112 enters the beam shaping optical system 130, which spatially homogenizes the optical intensity distribution of the laser light and shapes the laser light into a rectangular beam. The laser light having exited out of the beam shaping optical system 130 is incident on the mask 140. As the beam shaping optical system 130 driven by the uniaxial stage 138 moves in the axis-X direction at a moving speed Vxm, the irradiated region 141 moves on the mask 140 in the axis-X direction at the moving speed Vxm.

Part of the laser light is blocked in accordance with the mask pattern formed on the mask 140, and the remaining laser light passes through the mask 140. The laser light having passed through the mask 140 is reduced in size and projected by the projection optical system 145 on the surface of the workpiece 160. A laser light irradiated region 161 of the workpiece 160 has a reduced shape of a portion of the mask pattern formed on the mask 140 that is the portion corresponding to the irradiated region 141. The irradiated region 161 corresponds to a cross section of the optical path of the laser light taken along the surface of the workpiece 160. The irradiated region 161 corresponds to the second irradiated region in the present disclosure. When the workpiece 160 is irradiated with the laser light, the surface of the workpiece 160 undergoes abrasion or laser processing.

As the laser light irradiated region 141 of the mask 140 driven by the uniaxial stage 138 moves in the axis-X direction at the moving speed Vxm, the laser light irradiated region 161 of the workpiece 160 moves on the workpiece 160 in the axis-X direction at a moving speed −M·Vxm. M represents the magnification factor of the projection optical system 145. Since the projection optical system 145 is a reduction projection optical system, M is a positive value smaller than one. M may range, for example, from ½ to ¼. The direction in which the irradiated region 141 driven by the uniaxial stage 138 moves is opposite the direction in which the irradiated region 161 moves. The radiation width in the direction parallel to the short edges of the irradiated region 161 is M·Bx, and the radiation width in the direction parallel to the long edges of the irradiated region 161 is M·By.

1.2.3 Movement of Irradiated Region of Mask

Figure 2B:
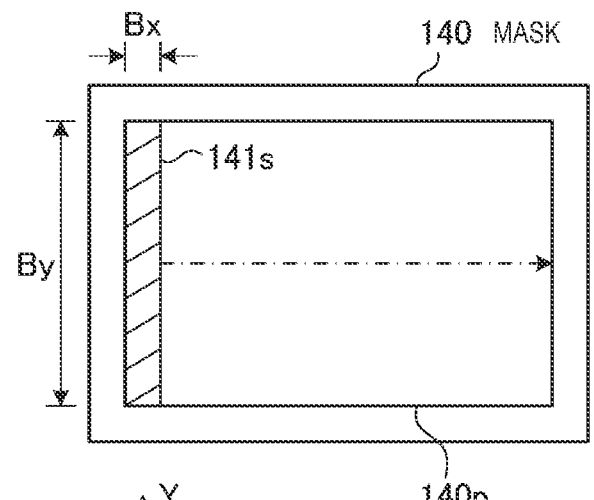
FIG. 2B is a plan view showing an example of the mask 140 irradiated with laser light in Comparable Example.

FIG. 2B is a plan view showing an example of the mask 140 irradiated with the laser light in Comparable Example. The mask 140 has a pattern region 140p, where the mask pattern is formed. The uniaxial stage 138 is driven to move the irradiated region 141 rightward from an initial position 141s located at the left end in FIG. 2B. The pattern region 140p is thus entirely irradiated with the laser light.

The uniaxial stage 138 is then driven in the opposite direction to move the irradiated region 141 leftward from the right end in FIG. 2B. The pattern region 140p is also in this case entirely irradiated with the laser light.

Switching the direction in which the uniaxial stage 138 is driven from one to the other as described above allows the pattern region 140p to be repeatedly irradiated with the laser light.

1.2.4 Movement of Irradiated Region of Workpiece

Figure 3:
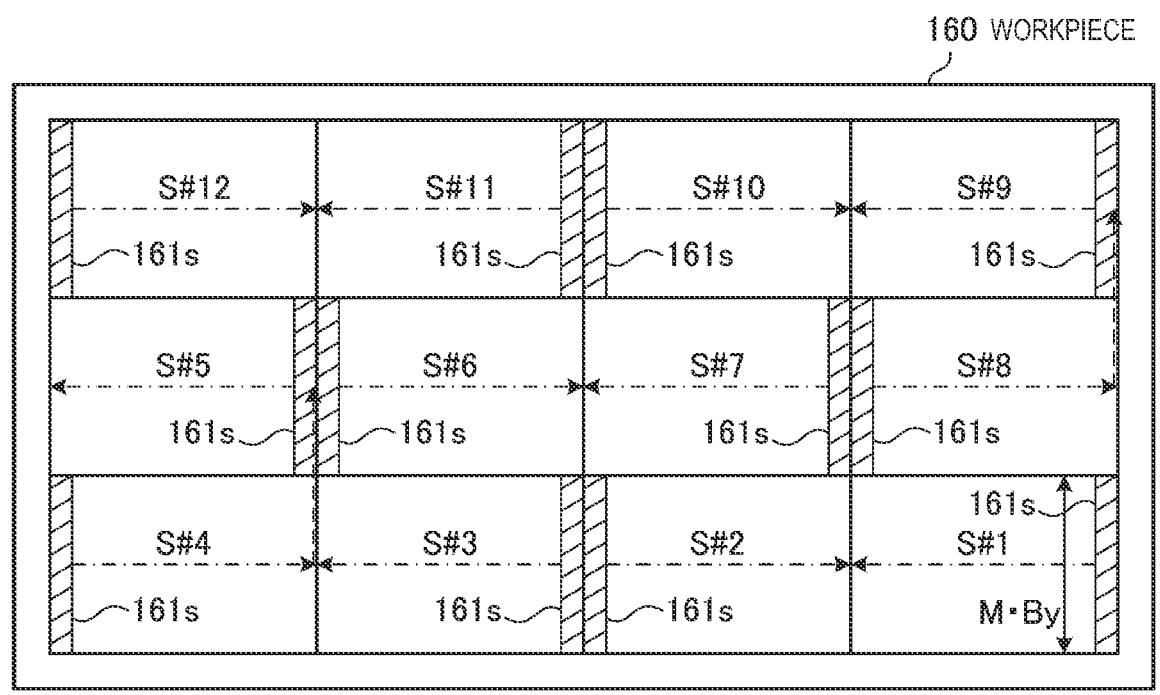
FIG. 3 is a plan view showing an example of a laser processing method for processing a workpiece 160 in a beam scan scheme.

FIG. 3 is a plan view showing an example of a laser-beam-scan processing method for processing the workpiece 160. In FIG. 3, the processing surface of the workpiece 160 is segmented into 12 processing target regions from "S #1" to "S #12." The order from the reference characters "S #1" to "S #12" corresponds to the order in accordance with which the workpiece 160 is processed in the beam scan scheme. The chain-line arrows represent the directions in which the irradiated region 161 in the processing target regions moves.

The XYZ stage 74 is first so operated to move the workpiece 160 that the region where the inverted image of the mask 140 is formed coincides with the first processing target region S #1, and the XYZ stage 74 is then stopped. The mask 140 is then irradiated with the laser light, and the laser light irradiated region 141 of the mask 140 is moved by the uniaxial stage 138 rightward from the initial position 141s, which is located at the left end in FIG. 2B. The laser light irradiated region 161 of the workpiece 160 thus moves leftward from an initial position 161s, which is located at the right end of the processing target region S #1 in FIG. 3. The beam scan action performed once completes the processing of the processing target region S #1.

When the beam scan action is completed in one processing target region, the radiation of the laser light is stopped.

The XYZ stage 74 is then so operated to move the workpiece 160 that the region where the inverted image of the mask 140 is formed coincides with the following processing target region S #2, and the XYZ stage 74 is then stopped. The mask 140 is then irradiated with the laser light, and the laser light irradiated region 141 of the mask 140 is moved by the uniaxial stage 138 leftward from the right end in FIG. 2B. The laser light irradiated region 161 of the workpiece 160 thus moves rightward from the initial position 161s, which is located at the left end of the processing target region S #2 in FIG. 3. The processing of the processing target region S #2 is thus completed.

Operating the XYZ stage 74 in the axis-X or axis-Y direction as described above changes the region where the inverted image of the mask 140 is formed in the order of "S #1," "S #2," "S #3," ..., "S #12." The direction in which the irradiated region 161 moves is reversed whenever the beam scan is performed on a processing target region basis and the region where the inverted image of the mask 140 is formed is changed. The laser processing is performed by the actions described above.

1.2.5 Operation of Laser Processing Controller 1.2.5.1 Main Procedure

Figure 4:
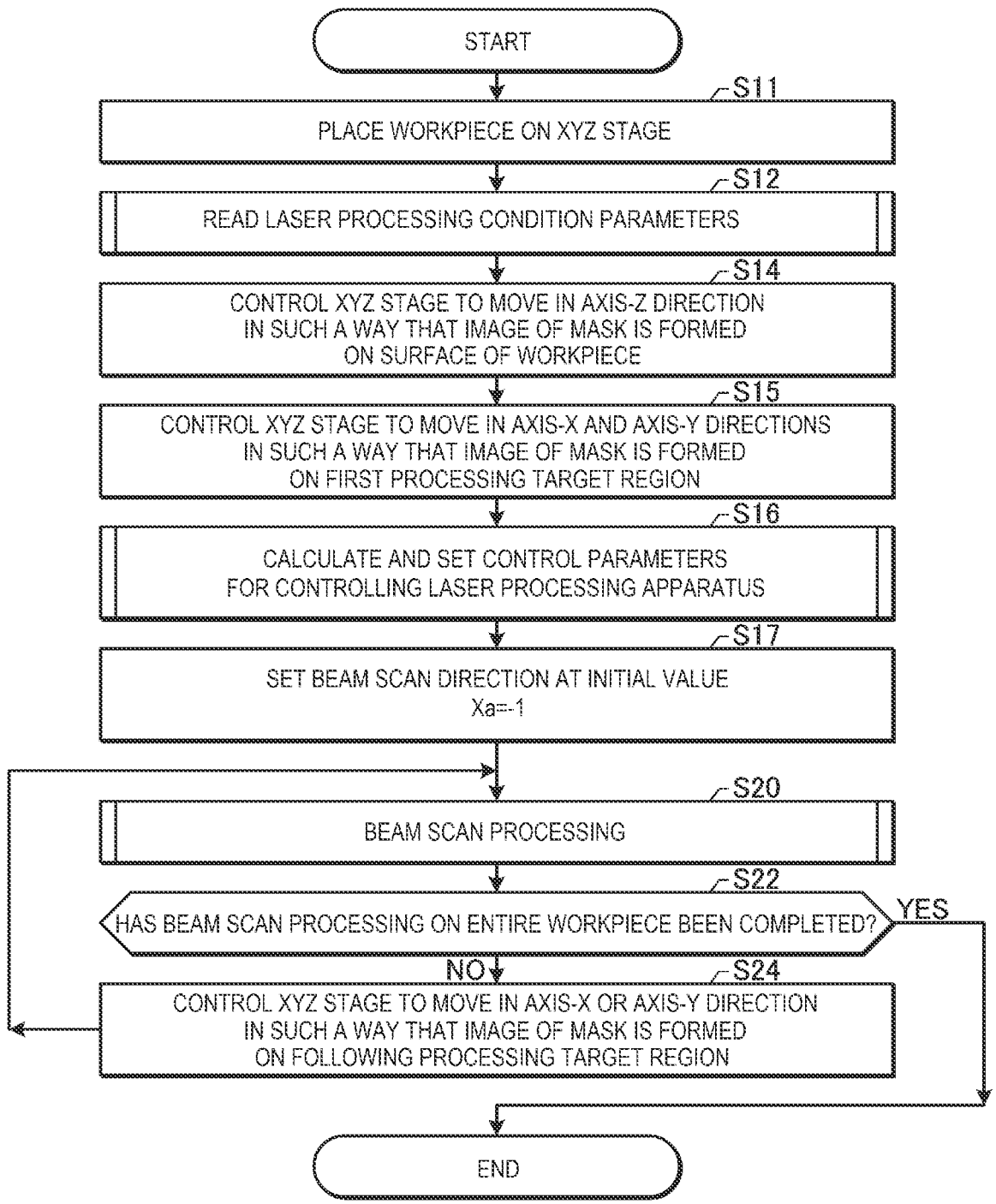
FIG. 4 is a flowchart showing the operation of a laser processing controller 100.

FIG. 4 is a flowchart showing the operation of the laser processing controller 100. The laser processing using the beam scan scheme is performed as follows.

In step S11, the workpiece 160 is placed on the table 76 on the XYZ stage 74. The workpiece 160 is placed on the table 76, for example, by a workpiece transfer robot or any other automatic transfer apparatus that is not shown but is controlled by the laser processing controller 100.

In step S12, the laser processing controller 100 reads laser processing condition parameters. The laser processing condition parameters will be described later with reference to FIG. 5.

In step S14, the laser processing controller 100 controls the XYZ stage 74 to move in an axis-Z direction in such a way that the image of the mask 140 is formed on the surface of the workpiece 160.

In step S15, the laser processing controller 100 controls the XYZ stage 74 to move in the axis-X and axis-Y directions in such a way that the image of the mask 140 is formed in the first processing target region S #1 of the workpiece 160.

In step S16, the laser processing controller 100 calculates and sets control parameters for controlling the laser processing apparatus 14. The control parameters for controlling the laser processing apparatus 14 will be described later with reference to FIG. 6.

In step S17, the laser processing controller 100 sets the value of a parameter Xa, which represents the beam scan direction on the workpiece 160, at an initial value of −1.

In step S20, the laser processing controller 100 controls the beam scan processing. The laser processing controller 100 performs the beam scan action on one processing target region to process the processing target region. The beam scan processing will be described later with reference to FIG. 7.

In step S22, the laser processing controller 100 evaluates whether or not the beam scan processing on the entire workpiece 160 has been completed. When the result of the evaluation in step S22 is No, the laser processing controller 100 proceeds to step S24.

In step S24, the laser processing controller 100 controls the XYZ stage 74 to move in the axis-X or axis-Y direction in such a way that the image of the mask 140 is formed in the following processing target region and then returns to step S20. The laser processing controller 100 repeats the processes in steps S20 to S22 until the beam scan processing on all the processing target regions is completed.

When the beam scan processing on all the processing target regions is completed, so that the result of the evaluation in step S22 is Yes, the laser processing controller 100 terminates the flowchart of FIG. 4.

1.2.5.2 Details of Reading of Laser Processing Condition Parameters

Figure 5:
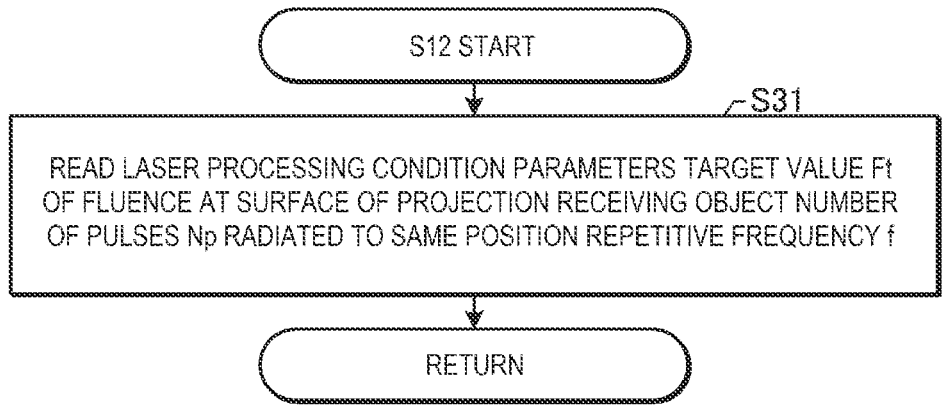
FIG. 5 is a flowchart showing an example of the content of the process of reading laser processing condition parameters.

FIG. 5 is a flowchart showing an example of the content of the process of reading the laser processing condition parameters. The flowchart shown in FIG. 5 corresponds to the subroutine of step S12 in FIG. 4.

In step S31, the laser processing controller 100 reads the following laser processing condition parameters from a storage apparatus that is now shown.

(a) Target value Ft of fluence at the surface of the workpiece 160
(b) The number of pulses Np radiated to the same position
(c) Repetitive frequency f The Number of pulses Np radiated to the same position is, for example, an integer greater than or equal to two.

After step S31, the laser processing controller 100 returns to the main procedure in FIG. 4.

1.2.5.3 Details of Calculation and Setting of Control Parameters

Figure 6:
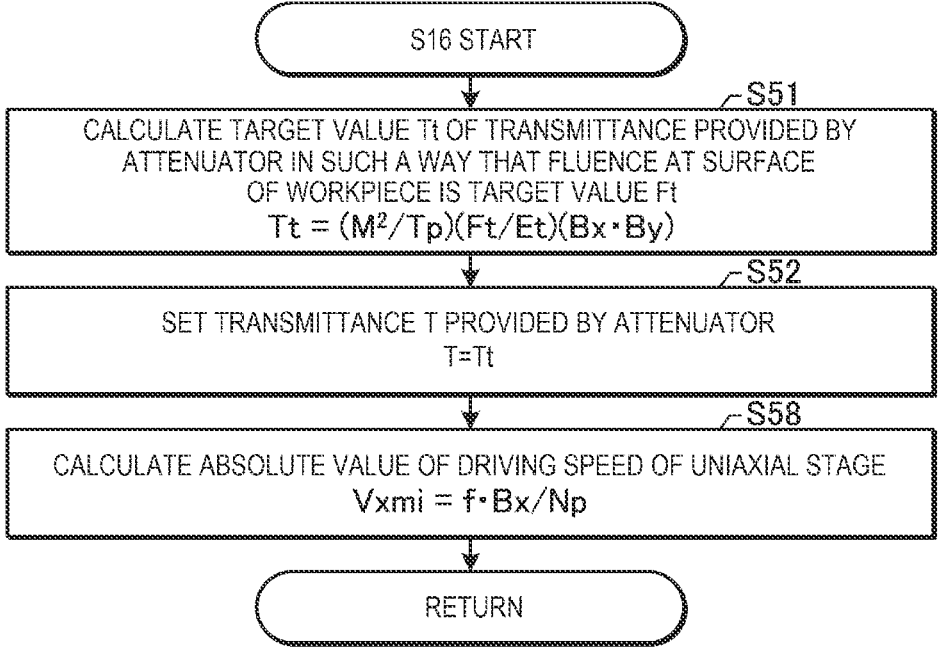
FIG. 6 is a flowchart showing an example of the content of the process of calculating and setting control parameters for controlling the laser processing apparatus 14.

FIG. 6 is a flowchart showing an example of the content of the process of calculating and setting the control parameters for controlling the laser processing apparatus 14. The flowchart shown in FIG. 6 corresponds to the subroutine of step S16 in FIG. 4.

In step S51, the laser processing controller 100 calculates a target value Tt of transmittance T provided by the attenuator 120 in such a way that fluence F at the surface of the workpiece 160 is the target value Ft. The target value Tt is calculated as follows.

First, let Tp be the transmittance provided by the optical system along the path along which the laser light outputted from the laser apparatus 12 reaches the workpiece 160 when the attenuator 120 provides the maximum transmittance. M represents the magnification factor of the projection optical system 145. The fluence F at the surface of the workpiece 160 is expressed by Expression (1) below, in which pulse energy T·Tp·Et at the surface of the workpiece 160 is divided by an area $M^2 \cdot Bx \cdot By$ of the laser light irradiated region 161 of the workpiece 160.

$$F = M^{-2}(T \cdot Tp \cdot Et)/(Bx \cdot By) \quad (1)$$

Based on Expression (1), the target value Tt of the transmittance T provided by the attenuator 120 and set to achieve the target value Ft of the fluence F at the surface of the workpiece 160 is expressed by Expression (2) below.

$$Tt = (M^2/Tp)(Ft/Et)(Bx \cdot By) \quad (2)$$

In step S52, the laser processing controller 100 sets the transmittance T provided by the attenuator 120 at the target value Tt. That is, the laser processing controller 100 controls the rotary stages 123 and 124 to adjust the angles of the partial reflection mirrors 121 and 122 in such a way that the transmittance T provided by the attenuator 120 approaches the target value Tt.

In step S58, the laser processing controller 100 then calculates an absolute value Vxmi of the driving speed of the uniaxial stage 138. The absolute value Vxmi of the driving speed of the uniaxial stage 138 is equal to an absolute value IVxml of the moving speed Vxm of the laser light irradiated region 141 of the mask 140. A period required to radiate the pulsed laser light having the repetitive frequency f Np times to the same position is Np/f. The absolute value of the driving speed of the uniaxial stage 138 is expressed by Expression (3) below, in which the radiation width Bx in the direction parallel to the short edges of the irradiated region 141 is divided by the required period Np/f.

$$Vxmi = f \cdot Bx/Np \quad (3)$$

After step S58, the laser processing controller 100 leaves the flowchart of FIG. 6 and returns to the main procedure in FIG. 4.

1.2.5.4 Details of Beam Scan Processing

Figure 7:
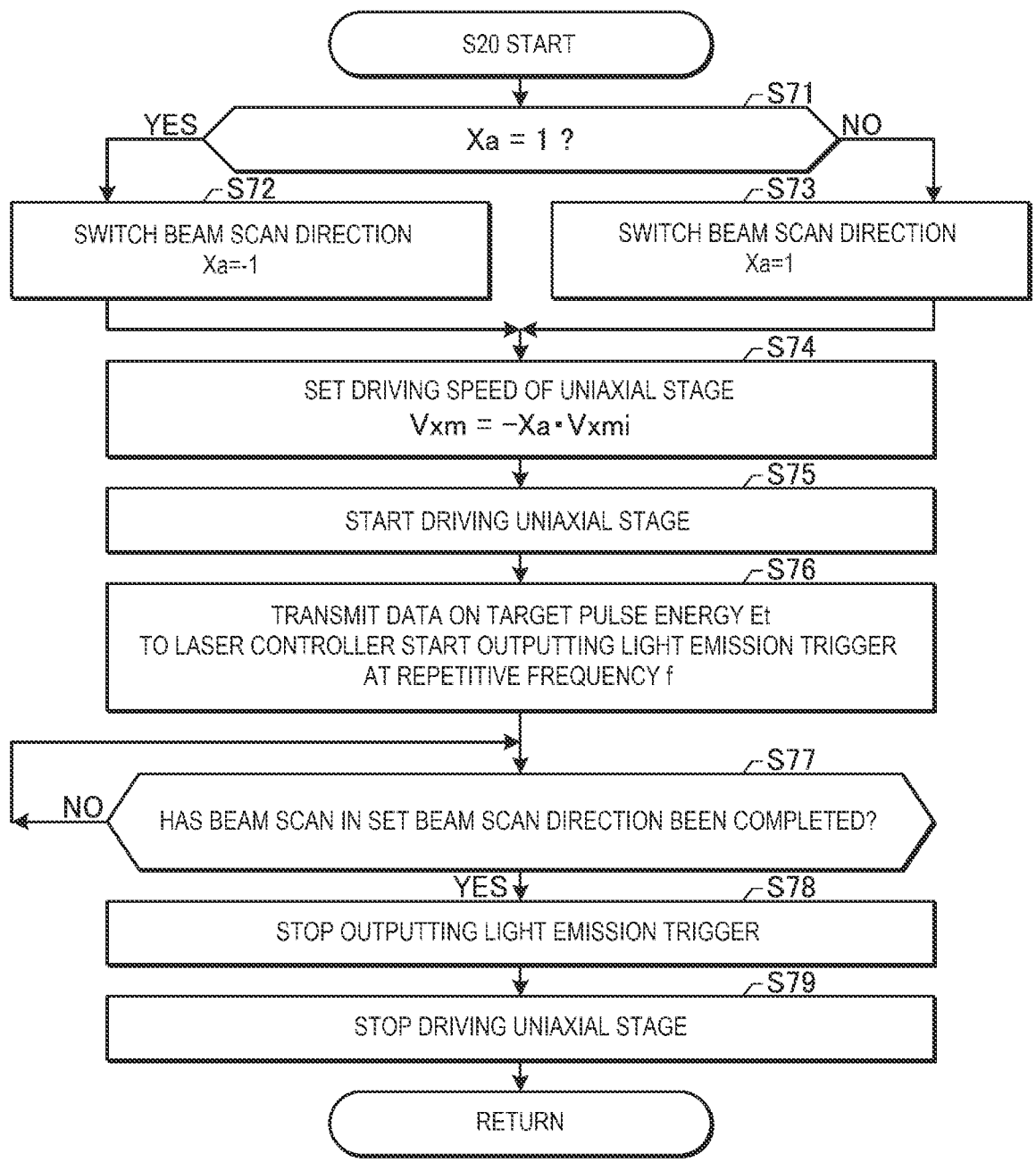
FIG. 7 is a flowchart showing an example of the content of the process of performing beam scan processing.

FIG. 7 is a flowchart showing an example of the content of the process of performing the beam scan processing. The flowchart shown in FIG. 7 corresponds to the subroutine of step S20 in FIG. 4.

In step S71, the laser processing controller 100 evaluates whether or not the value of the parameter Xa is 1.

When the result of the evaluation in step S71 is YES, that is, when the value of the parameter Xa is 1, the laser processing controller 100 proceeds to step S72 and sets the parameter Xa at −1.

On the other hand, when the result of the evaluation in step S71 is NO, that is, when the value of the parameter Xa is −1, the laser processing controller 100 proceeds to step S73 and sets the parameter Xa at 1.

That is, the laser processing controller 100 is configured to reverse the positive or negative sign of the parameter Xa to switch the beam scan direction to the direction opposite the beam scan direction set last time.

In step S17 in FIG. 4, the value of the parameter Xa is set at the initial value of −1 by way of example. In this case, when the processes in FIG. 7 are carried out for the first time, the value of the parameter Xa is set at 1 in step S73.

When the value of the parameter Xa is 1, the direction in which the irradiated region 161 moves on the surface of the workpiece 160 is, for example, the positive direction of the axis X or the leftward direction in FIG. 3. When the value of the parameter Xa is −1, the direction in which the irradiated region 161 moves on the surface of the workpiece 160 is the negative direction of the axis X or the rightward direction in FIG. 3.

After step S72 or S73, the laser processing controller 100 proceeds to step S74.

In step S74, the laser processing controller 100 sets the driving speed of the uniaxial stage 138. The driving speed of the uniaxial stage 138 is equal to both the moving speed Vxm of the beam shaping optical system 130 during its constant linear motion and the moving speed Vxm of the irradiated region 141 and is determined in accordance with Expression (4) below.

$$Vxm = -Xa \cdot Vxmi \quad (4)$$

Further, in step S74, a variety of parameters for controlling the uniaxial stage 138 may be so set that acceleration and deceleration before and after the constant linear motion are each performed for a predetermined period.

When the value of the moving speed Vxm determined by Expression (4) is negative, the driving direction of the uniaxial stage 138 is the negative direction of the axis X. As a result, the direction in which the laser light irradiated region 161 of the workpiece 160 moves is the positive direction of the axis X.

When the value of the moving speed Vxm determined by Expression (4) is positive, the driving direction of the uniaxial stage 138 is the positive direction of the axis X. As a result, the direction in which the laser light irradiated region 161 of the workpiece 160 moves is the negative direction of the axis X.

In step S75, the laser processing controller 100 starts driving the uniaxial stage 138. The uniaxial stage 138 accelerates the beam shaping optical system 130 and then causes it to perform the constant linear motion.

In step S76, the laser processing controller 100 transmits the data on the target pulse energy Et to the laser controller 28. The laser processing controller 100 starts outputting the light emission trigger at the repetitive frequency f to the laser controller 28. The laser apparatus 12 thus starts outputting the laser light. The uniaxial stage 138 is so controlled that the irradiated region 141 at the point of time when the laser apparatus 12 starts outputting the laser light coincides with the initial position 141s.

In step S77, the laser processing controller 100 evaluates whether or not the beam scan in the set beam scan direction has been completed. That is, the laser processing controller 100 evaluates whether or not the irradiated region 141 has moved in the axis-X direction from one end to the other end of the pattern region 140p of the mask 140.

The laser processing controller 100 repeats step S77 until the result of the evaluation in step S77 becomes YES. The processing target regions of the workpiece 160 are thus irradiated with the laser light. When the result of the evaluation in step S77 is YES, the laser processing controller 100 proceeds to step S78.

In step S78, the laser processing controller 100 stops outputting the light emission trigger. The laser apparatus 12 thus stops outputting the laser light.

In step S79, the laser processing controller 100 stops driving the uniaxial stage 138. The beam shaping optical system 130 is thus decelerated and then stopped.

After step S79, the laser processing controller 100 leaves the flowchart of FIG. 7 and returns to the main procedure in FIG. 4.

1.3 Problems

In Comparable Example described above, the transmittance provided by the attenuator 120 is changed to cause the fluence F to approach the target value Ft. Therefore, out of the energy of the laser light generated in the laser apparatus 12, the amount attenuated by the attenuator 120 is wasted. The smaller the target value Ft of the fluence F necessary for the processing is, the smaller the transmittance provided by the attenuator 120 needs to be, resulting in waste of the energy.

On the other hand, in preparation for a high target value Ft of the fluence F necessary for the processing, the fluence F provided when the transmittance provided by the attenuator 120 is maximized needs to be high. For example, the radiation width Bx in the direction parallel to the short edges of the irradiated region 141 needs to be set at a small value.

In Comparable Example described above, the radiation width By in the direction parallel to the long edges of the laser light irradiated region 141 of the mask 140 is roughly equal to the width of the pattern region 140p of the mask 140 in the axis-Y direction. The pattern region 140p of the mask 140 is, however, not always the same. When the pattern region 140p of the mask 140 in the axis-Y direction has a small width, a portion of the light with which the mask 140 is irradiated that is the portion that extends off the pattern region 140p is wasted.

The laser processing apparatuses 14 according to the embodiments described below are each so configured that the radiation width Bx in the direction parallel to the short edges of the irradiated region 141 and the radiation width By in the direction parallel to the long edges of the irradiated region 141 are independently changeable. The laser processing apparatuses 14 are each instead so configured that one of the radiation width Bx in the direction parallel to the short edges of the irradiated region 141 and the radiation width By in the direction parallel to the long edges of the irradiated region 141 is fixed and the other is changeable.

2. Laser Processing Apparatus Capable of Independently Changing Longitudinal and Lateral Radiation Widths

2.1 Configuration

Figure 8:
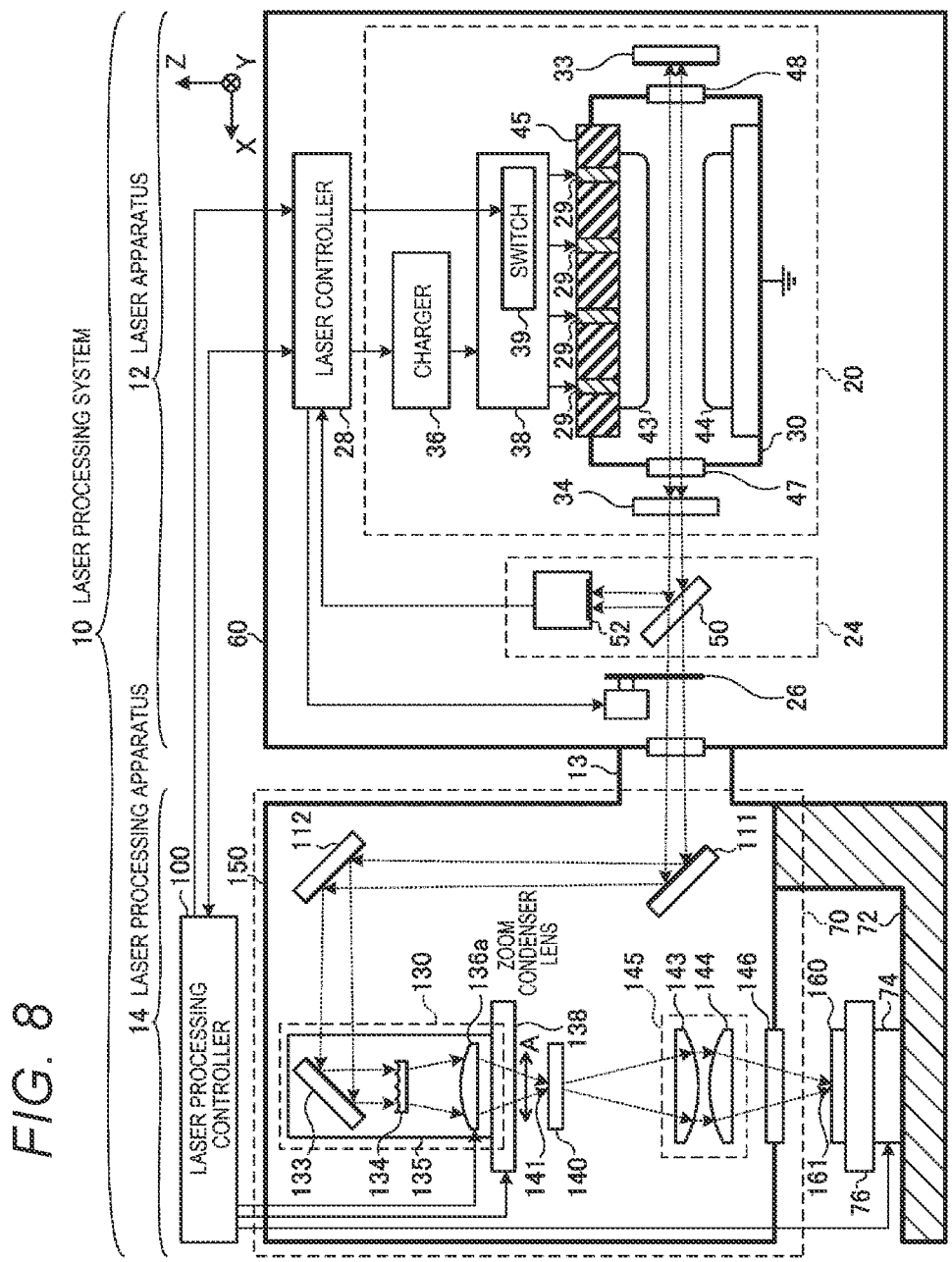
FIG. 8 schematically shows the configuration of the laser processing system 10 including the laser processing apparatus 14 according to a first embodiment of the present disclosure.

FIG. 8 schematically shows the configuration of the laser processing system 10 including the laser processing apparatus 14 according to a first embodiment of the present disclosure. In the first embodiment, the beam shaping optical system 130 provided in the laser processing apparatus 14 includes a zoom condenser lens 136a in place of the condenser lens 136 described with reference to FIG. 1. In the first embodiment, the laser processing apparatus 14 may not include the attenuator 120 described with reference to FIG. 1.

The zoom condenser lens 136a is disposed in a position on which the laser light having passed through the fly-eye lens 134 in incident. The zoom condenser lens 136a is configured to not only provide in conjunction with the fly-eye lens 134 the mask 140 with Koehler illumination in the form of a rectangular beam but be capable of independently changing the radiation width Bx in the direction parallel to the short edges of the irradiated region 141 and the radiation width By in the direction parallel to the long edges of the irradiated region 141. The zoom condenser lens 136a is instead so configured that one of the radiation width Bx in the direction parallel to the short edges of the irradiated region 141 and the radiation width By in the direction parallel to the long edges of the irradiated region 141 is fixed and the other is changeable. The radiation width Bx in the direction parallel to the short edges corresponds to a first radiation width in the present disclosure. The radiation width By in the direction parallel to the long edges corresponds to a second radiation width in the present disclosure. An example of the configuration of the zoom condenser lens 136a will be described later with reference to FIGS. 11A, 11B, 12A, and 12B.

The other points of the configuration in the first embodiment are the same as those in Comparable Example.

2.2 Operation

2.2.1 Calculation and Setting of Control Parameters

FIG. 9 is a flowchart showing an example of the content of the process of calculating and setting the control parameters for controlling the laser processing apparatus 14, the calculation and setting process carried out in the first embodiment. The flowchart shown in FIG. 9 corresponds to the subroutine of step S16 in FIG. 4 and is carried out in place of the flowchart in FIG. 6 in Comparable Example described above.

In step S53a, the laser processing controller 100 calculates a target value Fmt of the fluence at the surface of the mask 140. Since the area of the laser light irradiated region 141 of the mask 140 is $1/M^2$ times the area of the laser light irradiated region 161 of the workpiece 160, the target value Fmt of the fluence at the surface of the mask 140 is therefore expressed by Expression (5) below.

$$Fmt = M^2 \cdot Ft \quad (5)$$

In step S55a, the laser processing controller 100 calculates a target value Bxt of the radiation width Bx in the direction parallel to the short edges of the irradiated region 141 in such a way that the fluence at the surface of the mask 140 is the target value Fmt. The pulse energy at the surface of the mask 140 roughly coincides with the target pulse energy Et. The fluence at the surface of the mask 140 is obtained by dividing the pulse energy Et by the area Bx·By of the laser light irradiated region 141 of the mask 140. The target value Bxt of the radiation width Bx in the direction parallel to the short edges of the irradiated region 141 is therefore expressed by Expression (6) below.

$$Bxt = Et/(Fmt \cdot By) \tag{6}$$

In step S58, the laser processing controller 100 calculates the absolute value Vxmi of the moving speed of the uniaxial stage 138. The process in step S58 is the same as the process described with reference to FIG. 6.

In step S59a, the laser processing controller 100 controls the zoom condenser lens 136a to adjust the radiation width Bx in the direction parallel to the short edges of the irradiated region 141 to the target value Bxt. The fluence at the surface of the mask 140 can thus approach the target value Fmt, whereby the fluence at the surface of the workpiece 160 can approach the target value Ft. At this point, the radiation width By in the direction parallel to the long edges of the irradiated region 141 may be fixed.

After step S59a, the laser processing controller 100 leaves the flowchart of FIG. 9 and returns to the main procedure in FIG. 4.

2.2.2 Movement of Irradiated Region of Mask

FIGS. 10A and 10B are plan views showing an example of the mask 140 irradiated with the laser light in the first embodiment. The zoom condenser lens 136a is configured to be capable of changing the radiation width Bx in the direction parallel to the short edges of the irradiated region 141. The shape and size in the initial position 141s shown in FIGS. 10A and 10B correspond to the shape and size of the laser light irradiated region 141 of the mask 140.

When the irradiated region 141 has the shape and size shown in the initial position 141s in FIG. 10A and the fluence at the surface of the mask 140 does not reach the target value Fmt, the radiation width Bx in the direction parallel to the short edges is reduced. As shown in FIG. 10B, setting the target value Bxt of the radiation width Bx in the direction parallel to the short edges at a smaller value allows the fluence at the surface of the mask 140 to approach the target value Fmt.

Conversely, to lower the fluence at the surface of the mask 140, the target value Bxt of the radiation width Bx in the direction parallel to the short edges may be set at a larger value.

The other points of the operation in the first embodiment are the same as those in Comparable Example.

2.3 Effects

According to the first embodiment, since the radiation width Bx in the direction parallel to the short edges of the irradiated region 141 is changed in accordance with the target value Fmt of the fluence, the fluence can be adjusted without use of the attenuator 120. The waste of the energy of the laser light can thus be suppressed.

When the target value Fmt of the fluence is small, the radiation width Bx in the direction parallel to the short edges can be increased. The absolute value Vxmi of the driving speed of the uniaxial stage 138 calculated in step S58 thus increases. The processing speed can therefore be increased, whereby the throughput can be improved.

2.4 Example of Configuration of Beam Shaping Optical System

FIGS. 11A and 11B show an example of the configurations of the fly-eye lens 134 and the zoom condenser lens 136a. FIG. 11A shows the lenses viewed along the axis-Y direction, and FIG. 11B shows the lenses viewed along the axis-X direction.

The fly-eye lens 134 includes an X-direction fly-eye lens 134x and a Y-direction fly-eye lens 134y. The X-direction fly-eye lens 134x is a lens having a plurality of cylindrical surfaces arranged in the axis-X direction, and the cylindrical surfaces each have a focal axis in the axis-Y direction. The Y-direction fly-eye lens 134y is a lens having a plurality of cylindrical surfaces arranged in the axis-Y direction, and the cylindrical surfaces each have a focal axis in the axis-X direction.

The zoom condenser lens 136a includes an X-direction zoom condenser lens 136x and a Y-direction zoom condenser lens 136y. The X-direction zoom condenser lens 136x includes, for example, three cylindrical lenses, which each have a focal axis in the axis-Y direction. The Y-direction zoom condenser lens 136y includes, for example, three cylindrical lenses, which each have a focal axis in the axis-X direction. The configurations of the three cylindrical lenses will be described later with reference to FIGS. 12A and 12B.

The X-direction fly-eye lens 134x is so disposed that the focal plane of the X-direction fly-eye lens 134x coincides with the front focal plane of the X-direction zoom condenser lens 136x. The X-direction zoom condenser lens 136x is so disposed that the rear focal plane of the X-direction zoom condenser lens 136x coincides with the position of the mask 140.

The Y-direction fly-eye lens 134y is so disposed that the focal plane of the Y-direction fly-eye lens 134y coincides with the front focal plane of the Y-direction zoom condenser lens 136y. The Y-direction zoom condenser lens 136y is so disposed that the rear focal plane of the Y-direction zoom condenser lens 136y coincides with the position of the mask 140.

The laser light incident on the plurality of cylindrical surfaces of the X-direction fly-eye lens 134x is enlarged by the cylindrical surfaces, and the mask 140 is irradiated with the enlarged laser light via the X-direction zoom condenser lens 136x. In this process, the light incident on each of the plurality of cylindrical surfaces is superimposed on the light incident on the other cylindrical surfaces in the same position on the mask 140, whereby the optical intensity distribution in the axis-X direction is homogenized.

The same holds true for the axis-Y direction; the Y-direction fly-eye lens 134y and the Y-direction zoom condenser lens 136y homogenize the optical intensity distribution in the axis-Y direction.

As described above, the optical intensity distributions are homogenized in the axis-X and axis-Y directions, and the rectangular irradiated region 141 is formed. The radiation width Bx in the direction parallel to the short edges of the irradiated region 141 and the radiation width By in the direction parallel to the long edges of the irradiated region 141 can be changed by the X-direction zoom condenser lens 136x and the Y-direction zoom condenser lens 136y, respectively.

FIGS. 12A and 12B show examples of the configurations of the X-direction fly-eye lens 134x and the X-direction zoom condenser lens 136x.

The three cylindrical lenses that form the X-direction zoom condenser lens 36x include two cylindrical convex lenses and one cylindrical concave lens disposed between the two cylindrical convex lenses.

Adjusting the gap between the X-direction fly-eye lens 134x and each of the three cylindrical lenses changes the focal length of the X-direction zoom condenser lens 136x. Changing the focal length of the X-direction zoom condenser lens 136x allows a change in the radiation width Bx in the direction parallel to the short edges of the irradiated region 141. The radiation width Bx in the direction parallel to the short edges of the irradiated region 141 is proportional to the focal length of the X-direction zoom condenser lens 136x. FIG. 12A shows a case where the radiation width Bx in the direction parallel to the short edges is small, and FIG. 12B shows a case where the radiation width Bx in the direction parallel to the short edges is large. FIGS. 12A and 12B show, out of a plurality of light rays having exited out of the X-direction fly-eye lens 134x, first light rays that gather at the center of the irradiated region 141 and second light rays that gather at the right end of the irradiated region 141 and do not show the other light rays. The gap between the point where the first light rays gather and the point where the second light rays gather is half the radiation width Bx.

The X-direction zoom condenser lens 136x, which is formed of the three lenses shown in FIGS. 12A and 12B, allows a change in the radiation width Bx and further satisfies the following conditions:

(1) The distance from the pupil plane (X-direction fly-eye lens 134x) to the image plane (mask 140) is fixed.
(2) The telecentricity at the pupil plane and the image plane does not substantially change.

The cylindrical convex lens disposed in a position close to the X-direction fly-eye lens 134x functions as a focusing lens. The cylindrical concave lens functions as a front-state variator, and the cylindrical convex lens disposed in a position close to the mask 140 functions as a primary variator. The primary variator further has the role of improving the telecentricity of the chief rays.

The configurations of the Y-direction fly-eye lens 134y and the Y-direction zoom condenser lens 136y are the same as those described with reference to FIGS. 12A and 12B.

The radiation width Bx in the direction parallel to the short edges of the irradiated region 141 and the radiation width By in the direction parallel to the long edges of the irradiated region 141 can thus be independently changed.

Instead, one of the radiation width Bx in the direction parallel to the short edges and the radiation width By in the direction parallel to the long edges may be fixed, and the other may be changeable.

For example, the fluence may be configured to be adjustable by fixing the radiation width By in the direction parallel to the long edges and changing only the radiation width Bx in the direction parallel to the short edges, as described with reference to FIGS. 9 and 10. In this case, a condenser lens including cylindrical lenses may be used in place of the Y-direction zoom condenser lens 136y.

Instead, for example, the fluence may be configured to be adjustable by fixing the radiation width Bx in the direction parallel to the short edges and changing only the radiation width By in the direction parallel to the long edges. In this case, a condenser lens including cylindrical lenses may be used in place of the X-direction zoom condenser lens 136x.

3. Laser Processing Apparatus that Matches Radiation Width with Mask Width

3.1 Overview

A second embodiment of the present disclosure will next be described. The configuration in the second embodiment is the same as the configuration in the first embodiment described with reference to FIG. 8. In the second embodiment, the radiation width By in the direction parallel to the long edges of the irradiated region 141 is caused to coincide with a mask width Bmy in the axis-Y direction of the mask 140.

3.2 Operation 3.2.1 Reading of Laser Processing Condition Parameters

Figure 13:
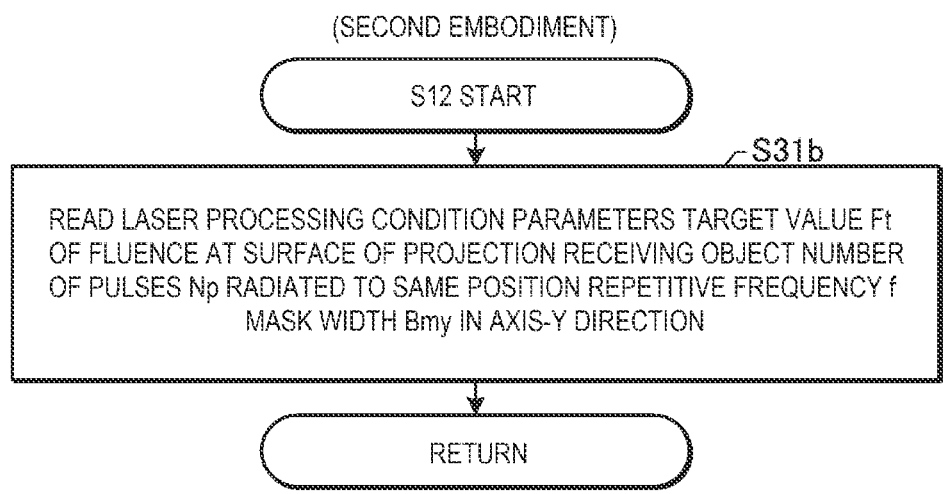
FIG. 13 is a flowchart showing an example of the content of the process of reading the laser processing condition parameters, the reading process carried out in a second embodiment.

FIG. 13 is a flowchart showing an example of the content of the process of reading the laser processing condition parameters, the reading process carried out in the second embodiment. The flowchart shown in FIG. 13 corresponds to the subroutine of step S12 in FIG. 4 and is carried out in place of the flowchart in FIG. 5 in Comparable Example described above.

In step S31b, the laser processing controller 100 reads the following laser processing condition parameters from a storage apparatus that is not shown.
(a) Target value Ft of the fluence at the surface of the workpiece 160
(b) The number of pulses Np radiated to the same position
(c) Repetitive frequency f
(d) Mask width Bmy in the axis-Y direction The items (a) to (c) described above are the same as those in Comparable Example. The axis-Y direction in (d) corresponds to the direction parallel to the long edges of the irradiated region 141. The mask width Bmy may be the width of the pattern region 140p, where the mask pattern is formed.

After step S31b, the laser processing controller 100 returns to the main procedure in FIG. 4.

3.2.2 Calculation and Setting of Control Parameters

Figure 14:
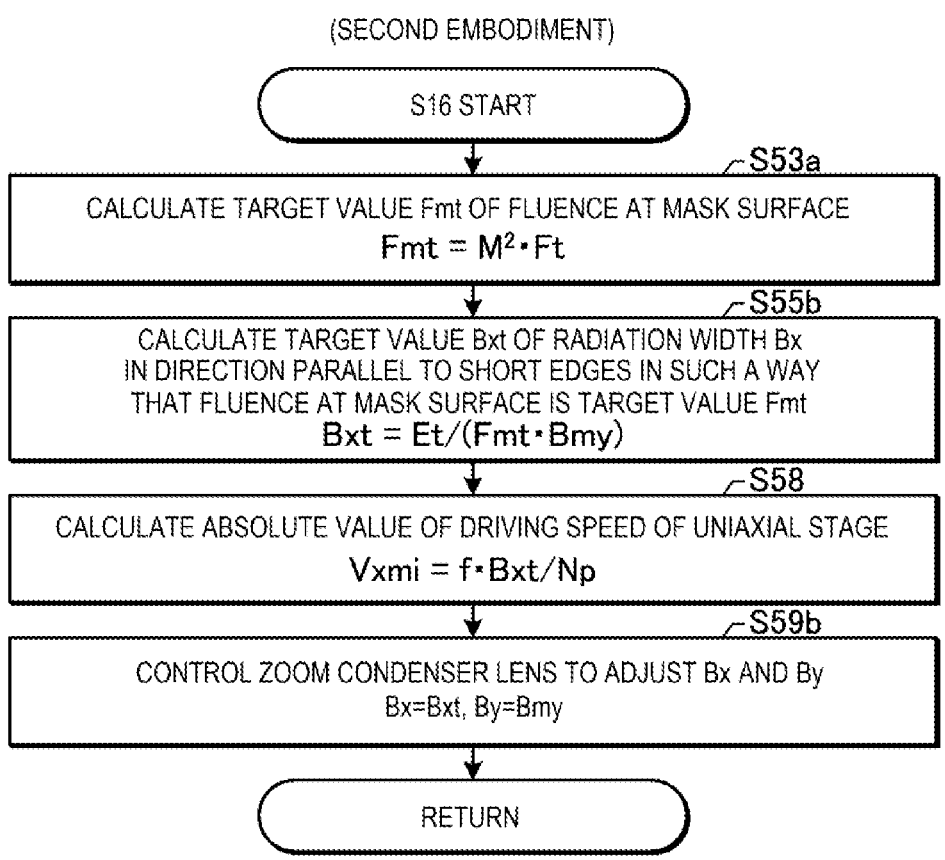
FIG. 14 is a flowchart showing an example of the content of the process of calculating and setting the control parameters for controlling the laser processing apparatus 14, the calculation and setting process carried out in the second embodiment.

FIG. 14 is a flowchart showing an example of the content of the process of calculating and setting the control parameters for controlling the laser processing apparatus 14, the calculation and setting process carried out in the second embodiment. The flowchart shown in FIG. 14 corresponds to the subroutine of step S16 in FIG. 4 and is carried out in place of the flowchart in FIG. 6 in Comparable Example described above.

In step S53a, the laser processing controller 100 calculates the target value Fmt of the fluence at the surface of the mask 140. The process in step S53a is the same as the process described with reference to FIG. 9.

In step S55b, the laser processing controller 100 calculates the target value Bxt of the radiation width Bx in the direction parallel to the short edges of the irradiated region 141 in such a way that the fluence at the surface of the mask 140 is the target value Fmt. It is assumed that the radiation width in the direction parallel to the long edges of the irradiated region 141 is set at the mask width Bmy in the axis-Y direction. The target value Bxt of the radiation width Bx in the direction parallel to the short edges of the irradiated region 141 is expressed by Expression (7) below.

$$Bxt = Et/(Fmt \cdot Bmy) \quad (7)$$

In step S58, the laser processing controller 100 calculates the absolute value Vxmi of the driving speed of the uniaxial stage 138. The process in step S58 is the same as the process described with reference to FIG. 6.

In step S59b, the laser processing controller 100 controls the zoom condenser lens 136a to adjust the radiation width Bx in the direction parallel to the short edges of the irradiated region 141 to the target value Bxt and adjust the radiation width By in the direction parallel to the long edges of the irradiated region 141 to the mask width Bmy in the axis-Y direction.

After step S59b, the laser processing controller 100 leaves the flowchart of FIG. 14 and returns to the main procedure in FIG. 4.

3.2.3 Movement of Irradiated Region of Mask

Figure 15A:
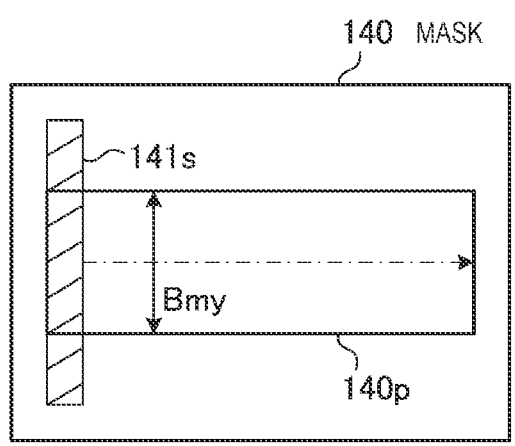
FIGS. 15A and 15B are plan views showing an example of the mask 140 irradiated with the laser light in the second embodiment.
Figure 15B:
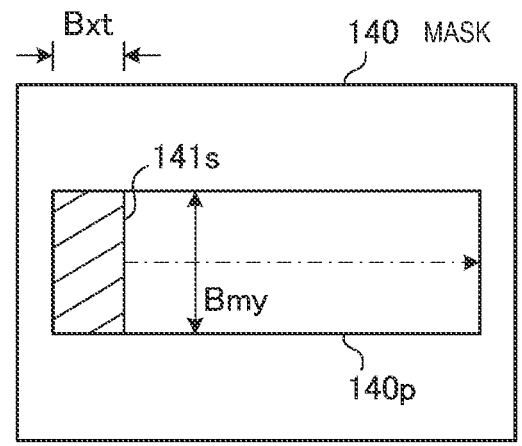

FIGS. 15A and 15B are plan views showing an example of the mask 140 irradiated with the laser light in the second embodiment. The zoom condenser lens 136a is so configured as to be capable of changing both the radiation width Bx in the direction parallel to the short edges of the laser light irradiated region 141 of the mask 140 and the radiation width By in the direction parallel to the long edges of the laser light irradiated region 141. The shape and size in the initial position 141s shown in FIGS. 15A and 15B correspond to the shape and size of the laser light irradiated region 141.

When the irradiated region 141 has the shape and size shown in the initial position 141s in FIG. 15A, a portion of the light with which the mask 140 is irradiated that is the portion that extends off the pattern region 140p is wasted. To avoid the waste, the radiation width By in the direction parallel to the long edges is set at the mask width Bmy in the axis-Y direction, as shown in FIG. 15B. Further, the target value Bxt of the radiation width Bx in the direction parallel to the short edges is set in accordance with the target value Fmt of the fluence.

Conversely, when the radiation width By in the direction parallel to the long edges is smaller than the mask width Bmy in the axis-Y direction, the radiation width By in the direction parallel to the long edges is increased.

The other points of the operation in the second embodiment are the same as those in the first embodiment.

3.3 Effects

According to the second embodiment, the radiation width By in the direction parallel to the long edges is set at the mask width Bmy in the axis-Y direction, whereby the pattern region 140p of the mask 140 can be effectively irradiated with the laser light, and the waste of the energy of the laser light can be suppressed.

Further, when the fluence is greater than the target value Fmt as a result of the reduction in the radiation width By in the direction parallel to the long edges, the radiation width Bx in the direction parallel to the short edges can be increased. The absolute value Vxmi of the driving speed of the uniaxial stage 138 calculated in step S58 thus increases. The processing speed can therefore be increased, whereby the throughput can be improved.

The above description has been made of the case where both the radiation width Bx in the direction parallel to the short edges of the irradiated region 141 and the radiation width By in the direction parallel to the long edges of the irradiated region 141 are changed, but the present disclosure is not limited thereto. Instead, the radiation width By in the direction parallel to the long edges may be so changeable as to approach the mask width Bmy in the axis-Y direction, whereas the radiation width Bx in the direction parallel to the short edges may be fixed.

4. Laser Processing Apparatus that Scans Mask Multiple Times 4.1 Configuration

Figure 16:
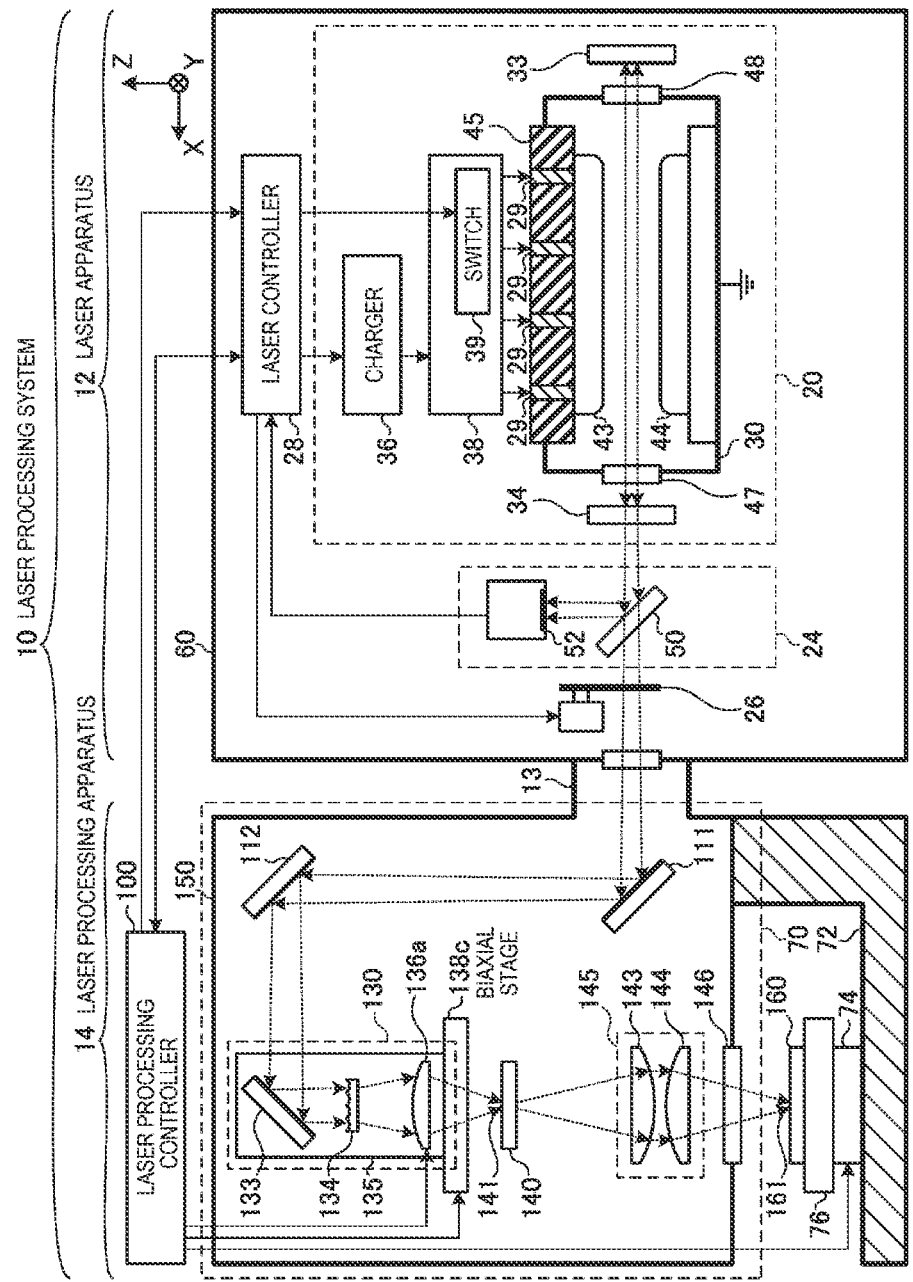
FIG. 16 schematically shows the configuration of the laser processing system 10 including the laser processing apparatus 14 according to a third embodiment of the present disclosure.

FIG. 16 schematically shows the configuration of the laser processing system 10 including the laser processing apparatus 14 according to a third embodiment of the present disclosure. In the third embodiment, the laser processing apparatus 14 includes a biaxial stage 138c in place of the uniaxial stage 138 shown in FIG. 8. The uniaxial stage 138 and the biaxial stage 138c correspond to the mover in the present disclosure.

The biaxial stage 138c is configured to be capable of moving the beam shaping optical system 130 and the irradiated region 141 not only in the axis-X direction but in the axis-Y direction.

The other points of the configuration in the third embodiment are the same as those in the first and second embodiments.

4.2 Operation

In the third embodiment, the radiation width By in the direction parallel to the long edges of the irradiated region 141 is set to be 1/n times the mask width Bmy of the mask 140 in the axis-Y direction. The reference character n represents a natural number. Whenever the irradiated region 141 is scanned with the laser light once in the axis-Y direction, the irradiated region 141 is moved by Bmy/n in the axis-Y direction, and the entire pattern region 140p is irradiated with the laser light by performing the scan actions n times.

4.2.1 Reading of Laser Processing Condition Parameters

Figure 17:
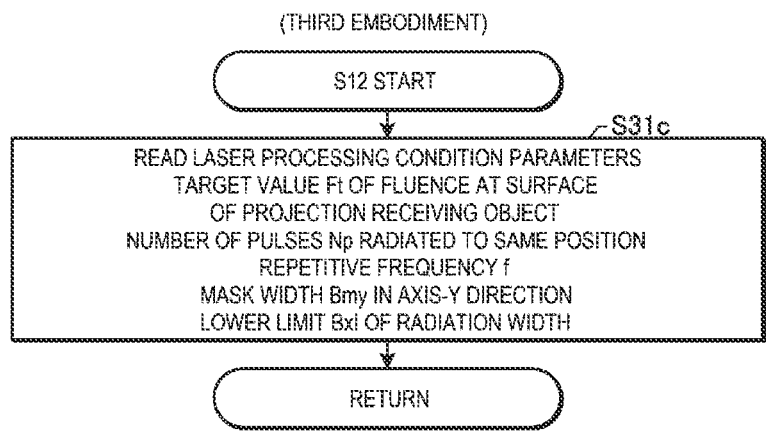
FIG. 17 is a flowchart showing an example of the content of the process of reading the laser processing condition parameters, the reading process carried out in the third embodiment.

FIG. 17 is a flowchart showing an example of the content of the process of reading the laser processing condition parameters, the reading process carried out in the third embodiment. The flowchart shown in FIG. 17 corresponds to the subroutine of step S12 in FIG. 4 and is carried out in place of the flowchart in FIG. 5 in Comparable Example described above.

In step S31c, the laser processing controller 100 reads the following laser processing condition parameters from a storage apparatus that is not shown.

(a) Target value Ft of the fluence at the surface of the workpiece 160
(b) The number of pulses Np radiated to the same position
(c) Repetitive frequency f
(d) Mask width Bmy in the axis-Y direction
(e) Lower limit BxI of the radiation width The items (a) to (d) described above are the same as those in the second embodiment.

The lower limit BxI in the item (e) described above is a value determined from the following restrictions.

In an optical system, a value called Lagrange invariant increases as light propagates but does not decrease. Let h be the image height and θ be the maximum light ray angle, and Lagrange invariant is expressed by h·tan θ.

To increase the fluence at the surface of the workpiece 160, the radiation width Bx in the direction parallel to the short edges of the irradiated region 141 may be reduced, as described above. When the radiation width Bx in the direction parallel to the short edges of the irradiated region 141 is reduced, however, the maximum light ray angle of the light that the beam shaping optical system 130 causes to be incident on the mask 140 increases. The reason for this is that Lagrange invariant does not decrease.

When the maximum light ray angle increases, the maximum light ray angle exceeds the angle corresponding to the numerical aperture of the projection optical system 145, and the light extends off the effective diameter of the projection optical system 145 in some cases. If the light extends off the effective diameter of the projection optical system 145, the fluence at the surface of the workpiece 160 decreases. That is, even when the radiation width Bx in the direction parallel to the short edges of the irradiated region 141 is further reduced, the fluence at the surface of the workpiece 160 cannot be increased. The radiation width Bx therefore has the lower limit BxI.

Let L and Od be the beam diameter and the angle of divergence of the laser light that enters the beam shaping optical system 130, respectively, and let NA be the numerical aperture of the projection optical system 145, and the lower limit BxI of the radiation width Bx is given by Expression (8) below.

$$BxI = L \cdot \theta d / NA \quad (8)$$

The laser processing controller 100 may determine the lower limit BxI of the radiation width Bx based on the calculation using Expression (8).

After step S31c, the laser processing controller 100 returns to the main procedure in FIG. 4.

4.2.2 Calculation and Setting of Control Parameters

Figure 18:
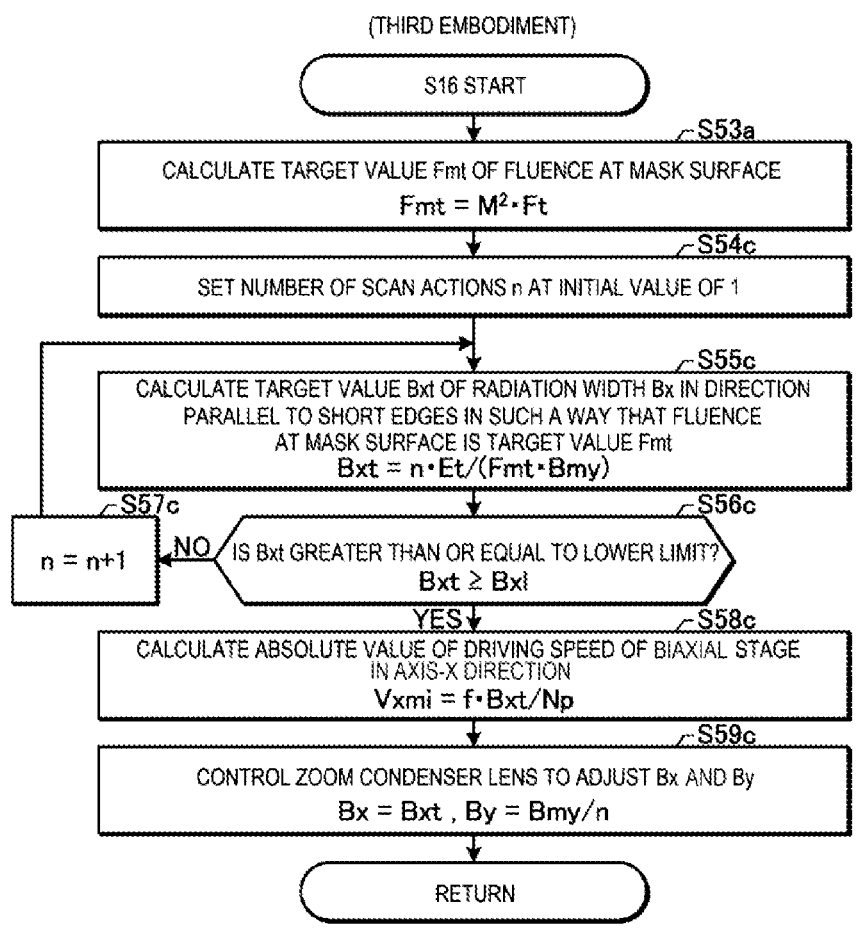
FIG. 18 is a flowchart showing an example of the content of the process of calculating and setting the control parameters of the laser processing apparatus 14, the calculation and setting process carried out in the third embodiment.

FIG. 18 is a flowchart showing an example of the content of the process of calculating and setting the control parameters of the laser processing apparatus 14, the calculation and setting process carried out in the third embodiment. The flowchart shown in FIG. 18 corresponds to the subroutine of step S16 in FIG. 4 and is carried out in place of the flowchart in FIG. 6 in Comparable Example described above.

In step S53a, the laser processing controller 100 calculates the target value Fmt of the fluence at the surface of the mask 140. The process in step S53a is the same as the process described with reference to FIG. 9.

In step S54c, the laser processing controller 100 sets the number of scan actions n at an initial value of 1. The number of scan actions n is the number by which the irradiated region 141 of the mask 140 is scanned in the axis-X direction and is determined by the processes in steps S55c to S57c.

In step S55c, the laser processing controller 100 calculates the target value Bxt of the radiation width Bx in the direction parallel to the short edges of the irradiated region 141 in such a way that the fluence at the surface of the mask 140 is the target value Fmt. The target value Bxt of the radiation width Bx in the direction parallel to the short edges of the irradiated region 141 is expressed by Expression (9) below.

$$Bxt = n \cdot Et / (Fmt \cdot Bmy) \quad (9)$$

Expression (9) differs from Expression (7) in the second embodiment in that the right hand of Expression (9) is multiplied by the number of scan actions n. In the third embodiment, the entire mask width Bmy in the axis-Y direction is irradiated with the laser light by scanning the mask 140 n times.

In step S56c, the laser processing controller 100 evaluates whether or not the target value Bxt of the radiation width Bx in the direction parallel to the short edges of the irradiated region 141 is greater than or equal to the lower limit BxI.

When the result of the evaluation in step S56c is NO, that is, when the target value Bxt of the radiation width Bx is too small so that the light extends off the effective diameter of the projection optical system 145, the laser processing controller 100 proceeds to step S57c.

In step S57c, the laser processing controller 100 adds one to the value n to update the value n and then returns to step S55c. As described above, the number of scan actions n is incremented by one until a target value Bxt of the radiation width Bx that does not cause the light to extend off the effective diameter of the projection optical system 145 is calculated.

When the result of the evaluation in step S56c is YES, the laser processing controller 100 proceeds to step S58c.

In step S58c, the laser processing controller 100 calculates the absolute value Vxmi of the driving speed of the biaxial stage 138c in the axis-X direction. The process in step S58c is the same as the process in step S58 described with reference to FIG. 6.

In step S59c, the laser processing controller 100 controls the zoom condenser lens 136a to adjust the radiation width Bx in the direction parallel to the short edges of the irradiated region 141 to the target value Bxt and adjust the radiation width By in the direction parallel to the long edges of the irradiated region 141 to Bmy/n. Bmy/n is the quotient of the operation of dividing the mask width Bmy in the axis-Y direction by the number of scan actions n and is smaller than or equal to the mask width Bmy. In the third embodiment, when high fluence cannot be achieved only by reducing the radiation width Bx in the direction parallel to the short edges, high fluence can be achieved by reducing the radiation width By in the direction parallel to the long edges.

After step S59c, the laser processing controller 100 leaves the flowchart of FIG. 18 and returns to the main procedure in FIG. 4.

4.2.3 Beam Scan Processing

Figure 19:
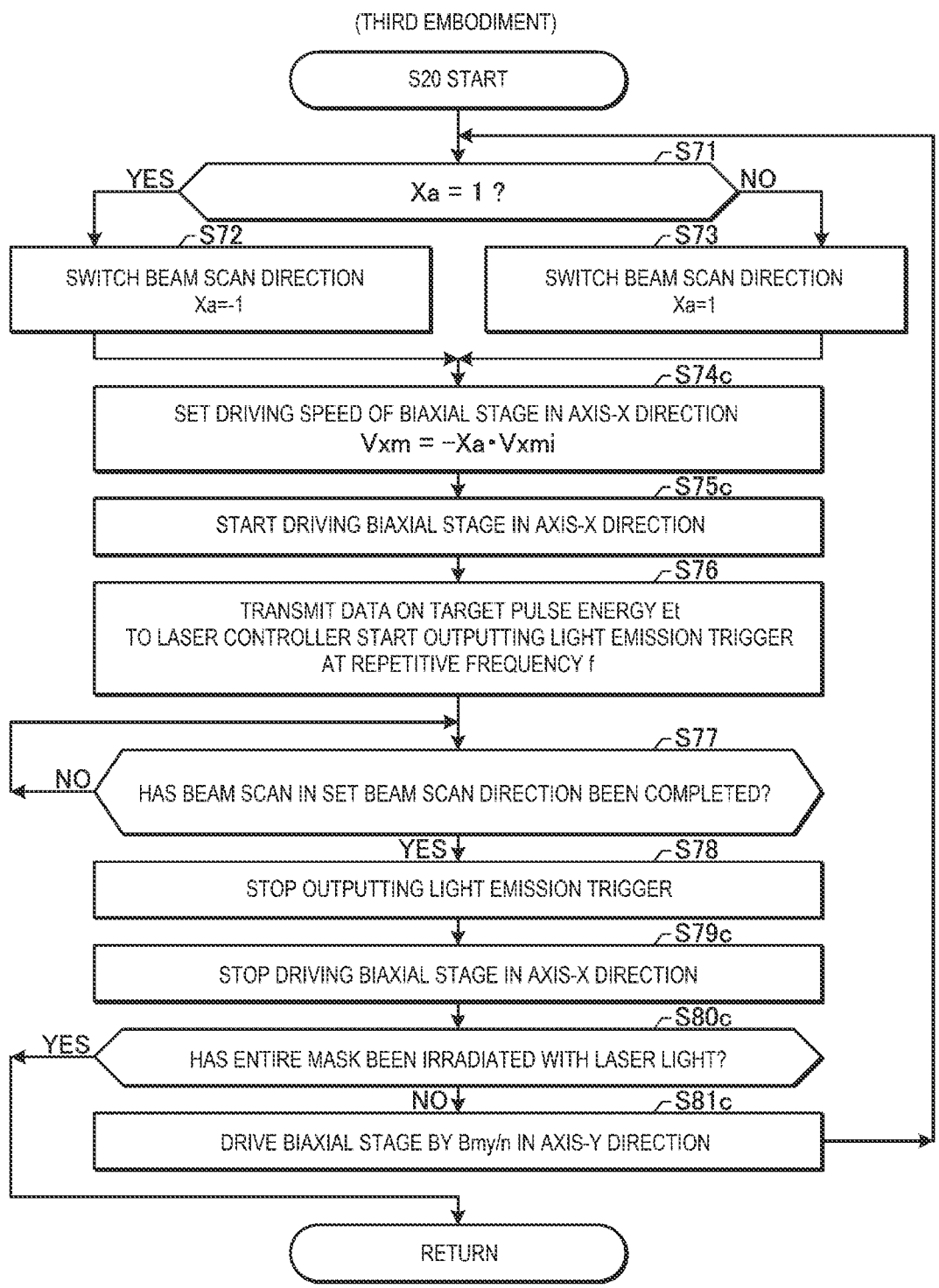
FIG. 19 is a flowchart showing an example of the content of the process of performing the beam scan processing, the process carried out in the third embodiment.

FIG. 19 is a flowchart showing an example of the content of the process of performing the beam scan processing, the process carried out in the third embodiment. The flowchart shown in FIG. 19 corresponds to the subroutine of step S20 in FIG. 4 and is carried out in place of the flowchart in FIG. 7 in Comparable Example described above.

In steps S71 to S73, the laser processing controller 100 reverses the positive or negative sign of the parameter Xa to switch the beam scan direction to the direction opposite the beam scan direction set last time. The processes in steps S71 to S73 are the same as those described with reference to FIG. 7.

After step S72 or S73, the laser processing controller 100 proceeds to step S74c.

In step S74c, the laser processing controller 100 sets the driving speed of the biaxial stage 138c in the axis-X direction.

In step S75c, the laser processing controller 100 starts driving the biaxial stage 138c in the axis-X direction.

The processes in steps S74c and S75c are the same as the processes in steps S74 and S75 described with reference to FIG. 7.

In step S76, the laser processing controller 100 transmits the data on the target pulse energy Et to the laser controller 28. The laser processing controller 100 starts outputting the light emission trigger at the repetitive frequency f to the laser controller 28.

In step S77, the laser processing controller 100 evaluates whether or not the beam scan in the set beam scan direction has been completed.

When the result of the evaluation in step S77 is YES, the laser processing controller 100 stops outputting the light emission trigger in step S78.

The processes in steps S76 to S78 are the same as those described with reference to FIG. 7.

In step S79c, the laser processing controller 100 stops driving of the biaxial stage 138c in the axis-X direction. The process in step S79c is the same as the process in step S79 described with reference to FIG. 7.

In step S80c, the laser processing controller 100 evaluates whether or not the entire mask 140 has been irradiated with the laser light.

When the beam scan has not been performed n times, the result of the evaluation in step S80c is NO. When the result of the evaluation in step S80c is NO, the laser processing controller 100 proceeds to step S81c.

In step S81c, the laser processing controller 100 drives the biaxial stage 138c by Bmy/n in the axis-Y direction. Bmy/n corresponds to the radiation width in the direction parallel to the long edges and is set in step S59c in FIG. 18.

After step S81c, the laser processing controller 100 returns to step S71, where the laser processing controller 100 switches the beam scan direction and repeats the processes in steps S71 to S80c until the beam scan is performed n times.

When the beam scan has been performed n times, the result of the evaluation in step S80c is YES. When the result of the evaluation in step S80c is YES, the laser processing controller 100 leaves the flowchart of FIG. 19 and returns to the main procedure in FIG. 4.

4.2.4 Movement of Irradiated Region of Mask

Figure 20A:
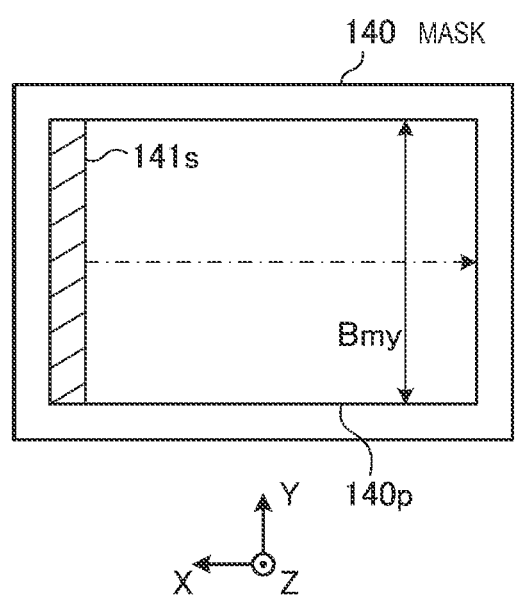
FIGS. 20A and 20B are plan views showing an example of the mask 140 irradiated with the laser light in the third embodiment.
Figure 20B:
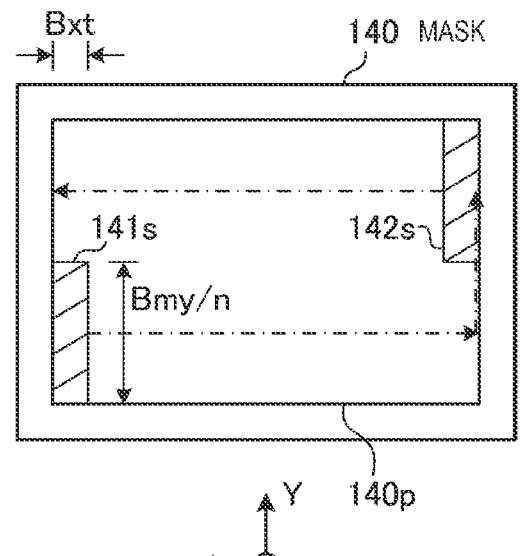

FIGS. 20A and 20B are plan views showing an example of the mask 140 irradiated with the laser light in the third embodiment. The zoom condenser lens 136a is so configured as to be capable of changing both the radiation width Bx in the direction parallel to the short edges of the laser light irradiated region 141 of the mask 140 and the radiation width By in the direction parallel to the long edges of the laser light irradiated region 141. The shape and size in the initial position 141s shown in FIGS. 20A and 20B correspond to the shape and size of the irradiated region 141.

When the radiation width By in the direction parallel to the long edges of the irradiated region 141 coincides with the mask width Bmy in the axis-Y direction, as shown in the initial position 141s in FIG. 20A, high fluence is not achieved in some cases only by adjusting the radiation width Bx in the direction parallel to the short edges. In this case, high fluence is achieved by setting the radiation width By in the direction parallel to the long edges at Bmy/n, as shown in FIG. 20B. Further, the target value Bxt of the radiation width Bx in the direction parallel to the short edges is set in accordance with the target value Fmt of the fluence.

The biaxial stage 138c is then driven to move the irradiated region 141 from the initial position 141s in FIG. 20B in the axis-X direction to perform first beam scan and then move the irradiated region 141 by Bmy/n in the axis-Y direction. Further, the irradiated region 141 is moved from an initial position 142s in FIG. 20B in the direction opposite the first beam scan direction, to perform second beam scan. The entire mask 140 is irradiated with the laser light by performing the beam scan n times.

4.2.5 Movement of Irradiated Region of Workpiece

Figure 21:
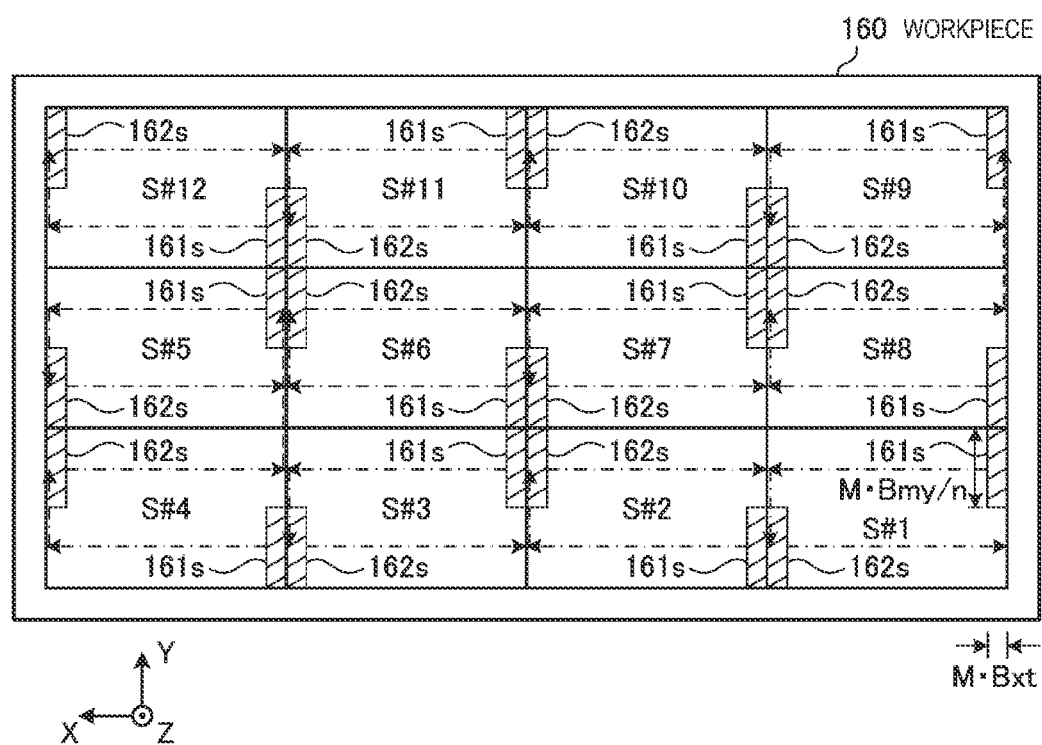
FIG. 21 is a plan view showing an example of a method for processing the workpiece 160 with the laser light in the third embodiment.

FIG. 21 is a plan view showing an example of a method for processing the workpiece 160 with laser light in the third embodiment. The processing target regions from "S #1" to "S #12" shown in FIG. 21 are the same as those described with reference to FIG. 3.

The XYZ stage 74 is first so operated to move the workpiece 160 that the region where the inverted image of the mask 140 is formed coincides with the first processing target region S #1, and the XYZ stage 74 is then stopped.

The mask 140 is then irradiated with the laser light, and the laser light irradiated region 141 of the mask 140 is moved by the biaxial stage 138c rightward from the initial position 141s in FIG. 20B. The laser light irradiated region 161 of the workpiece 160 thus moves leftward from the initial position 161s of the processing target region S #1 in FIG. 21. When the first beam scan action is completed, the radiation of the laser light is terminated.

The laser light irradiated region 141 of the mask 140 is then moved by the biaxial stage 138c by Bmy/n in the upward direction in FIG. 20B. The laser light irradiated region 161 of the workpiece 160 thus moves in the downward direction in FIG. 21.

The mask 140 is then irradiated with the laser light, and the laser light irradiated region 141 of the mask 140 is moved by the biaxial stage 138c leftward from the initial position 142s in FIG. 20B. The laser light irradiated region 161 of the workpiece 160 thus moves rightward from an initial position 162s of the processing target region S #1 in FIG. 21. When the second beam scan operation is completed, the radiation of the laser light is terminated.

The processing of the processing target region S #1 is completed by the beam scan action performed n times.

The XYZ stage 74 is then so operated to move the workpiece 160 that the region where the inverted image of the mask 140 is formed coincides with the following processing target region S #2, and the XYZ stage 74 is stopped. The beam scan action is then performed n times, as in the processing of the first processing target region S #1. It is, however, noted that the direction in which the laser light irradiated region 141 of the mask 140 moves is reversed from the direction used to process the first processing target region S #1. The laser light irradiated region 161 of the workpiece 160 therefore moves leftward from the initial position 161s of the processing target region S #2 in FIG. 21, moves upward, and then moves rightward from the initial position 162s.

Operating the XYZ stage 74 in the axis-X or axis-Y direction as described above changes the processing target region in the order of "S #1," "S #2," "S #3," . . . , "S #12." The laser processing is performed by performing the beam scan n times on a processing target region basis.

The other points of the operation in the third embodiment are the same as those in the first embodiment.

4.3 Effects

According to the third embodiment, when desired high fluence cannot be achieved by reducing the radiation width Bx in the direction parallel to the short edges of the irradiated region 141, the radiation width By in the direction parallel to the long edges of the irradiated region 141 is reduced. High-fluence laser processing can thus be performed without any change in the settings of the laser apparatus 12.

The above description has been made of the case where both the radiation width Bx in the direction parallel to the short edges of the irradiated region 141 and the radiation width By in the direction parallel to the long edges of the irradiated region 141 are changed, but the present disclosure is not limited thereto. The radiation width By in the direction parallel to the long edges may be so changeable to Bmy/n in accordance with the mask width Bmy in the axis-Y direction and the fluence target value Fmt, whereas the radiation width Bx in the direction parallel to the short edges may be fixed.

5. Laser Processing Apparatus Capable of Enlarging and Reducing Light that Enters Beam Shaping Optical System

5.1 Configuration

Figure 22:
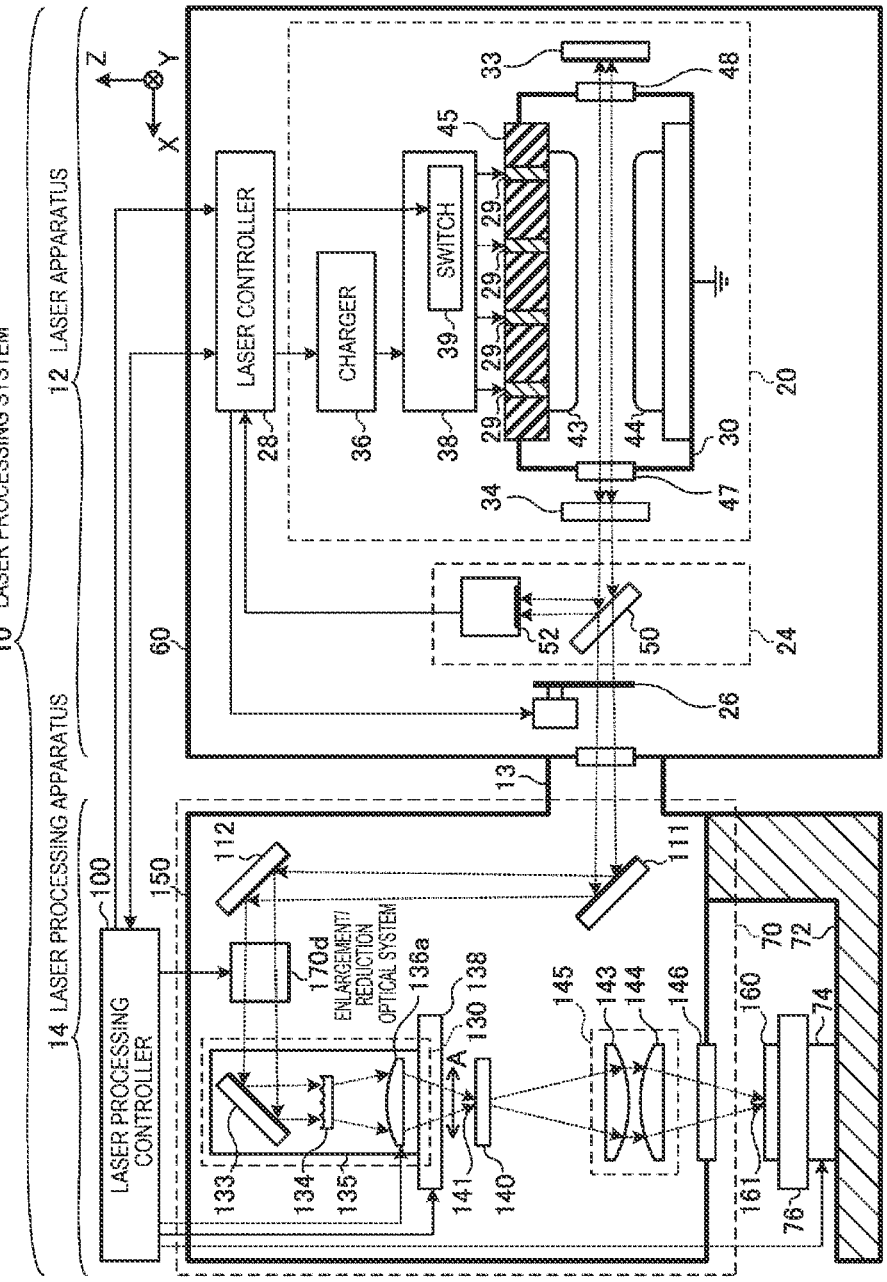
FIG. 22 schematically shows the configuration of the laser processing system 10 including the laser processing apparatus 14 according to a fourth embodiment of the present disclosure.

FIG. 22 schematically shows the configuration of the laser processing system 10 including the laser processing apparatus 14 according to a fourth embodiment of the present disclosure. In the fourth embodiment, the laser processing apparatus 14 includes an enlargement/reduction optical system 170d. The enlargement/reduction optical system 170d is disposed in the optical path of the laser light between the high-reflectance mirror 112 and the beam shaping optical system 130.

Figure 23A:
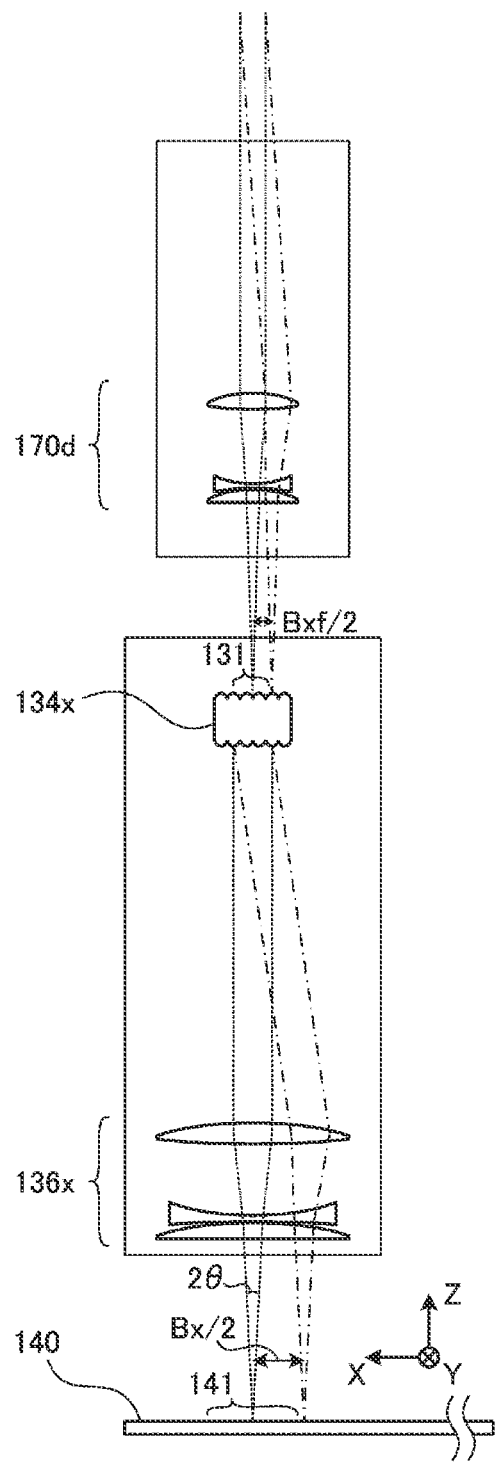
FIGS. 23A and 23B show an example of the configuration of an enlargement/reduction optical system 170d in the fourth embodiment along with the X-direction fly-eye lens 134x and the X-direction zoom condenser lens 136x.
Figure 23B:
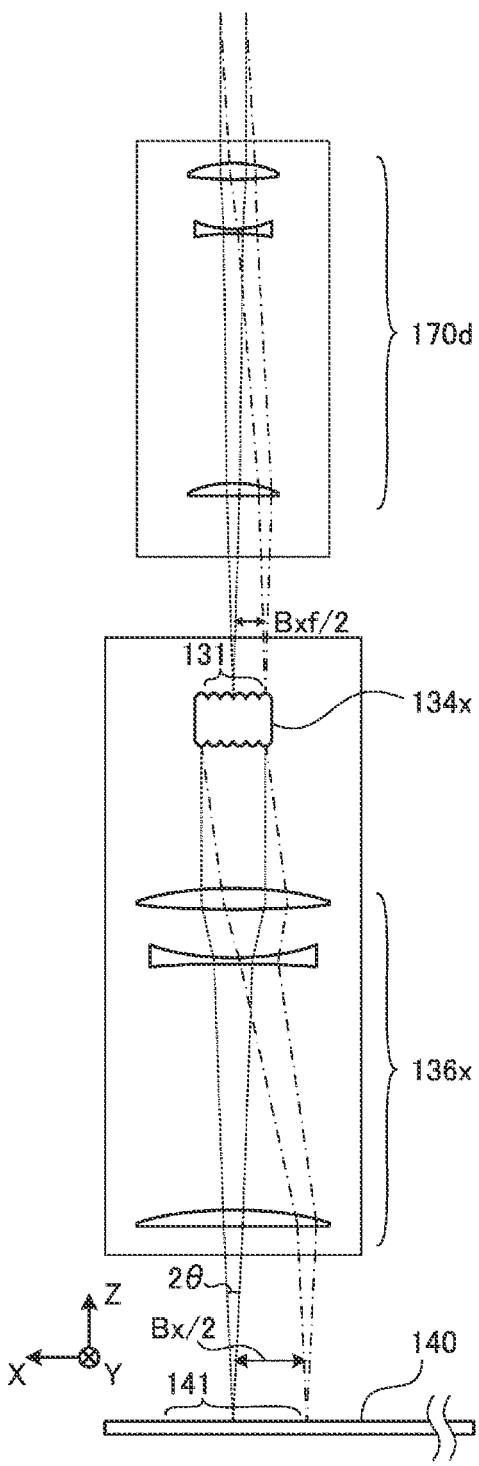

FIGS. 23A and 23B show an example of the configuration of the enlargement/reduction optical system 170d in the fourth embodiment along with the X-direction fly-eye lens 134x and the X-direction zoom condenser lens 136x. The X-direction fly-eye lens 134x and the X-direction zoom condenser lens 136x are the same as those described with reference to FIGS. 12A and 12B.

The enlargement/reduction optical system 170d shown in FIGS. 23A and 23B includes, for example, three cylindrical lenses. The three cylindrical lenses include two cylindrical convex lenses and one cylindrical concave lens disposed between the two cylindrical convex lenses.

Adjusting the position of each of the three cylindrical lenses changes the focal length of the enlargement/reduction optical system 170d. Changing the focal length of the enlargement/reduction optical system 170d allows a change in a radiation width Bxf in the direction parallel to the short edges of a laser light irradiated region 131 of the X-direction fly-eye lens 134x. The laser light irradiated region 131 of the X-direction fly-eye lens 134x corresponds to a third irradiated region in the present disclosure. The radiation width Bxf in the direction parallel to the short edges of the irradiated region 131 is proportional to the focal length of the enlargement/reduction optical system 170d. FIGS. 23A and 23B show, out of light rays outputted from the laser apparatus 12, first light rays that gather at the center of the irradiated region 131 and second light rays that gather at the right end of the irradiated region 131 and do not show the other light rays. The gap between the point where the first light rays gather and the point where the second light rays gather is half the radiation width Bxf in the direction parallel to the short edges of the irradiated region 131.

As described above, the configuration of the enlargement/reduction optical system 170d is the same as the configuration of the X-direction zoom condenser lens 136x. It is, however, noted that the lens diameter of the cylindrical lenses that form the enlargement/reduction optical system 170d may be smaller than the lens diameter of the cylindrical lenses that form the X-direction zoom condenser lens 136x.

FIGS. 23A and 23B show the optical system that changes the radiation width Bxf in the direction parallel to the short edges as the enlargement/reduction optical system 170d, but the present disclosure does not necessarily employ the configuration described above. As the enlargement/reduction optical system 170d, a first optical system that changes the radiation width Bxf in the direction parallel to the short edges of the laser light irradiated region 131 of the X-direction fly-eye lens 134x may be replaced with a second optical system that changes the radiation width in the direction parallel to the long edges of the laser light irradiated region of the Y-direction fly-eye lens 134y.

Further, both the first optical system and the second optical system may be disposed.

The enlargement/reduction optical system 170d is not limited to an optical system including cylindrical lenses and may instead be an optical system including prisms.

The other points of the configuration in the fourth embodiment are the same as those in the first and second embodiments. The laser processing apparatus 14 may instead include the biaxial stage 138c in place of the uniaxial stage 138, as in the third embodiment.

5.2 Operation

In the fourth embodiment, when the magnification factor of the X-direction zoom condenser lens 136x is lowered to reduce the radiation width Bx in the direction parallel to the short edges of the irradiated region 141, the enlargement/reduction optical system 170d reduces the radiation width Bxf in the direction parallel to the short edges of the irradiated region 131. Conversely, to increase the radiation width Bx, the radiation width Bxf is increased. The same holds true for the direction parallel to the long edges, that is, the axis-Y direction. The reason for this is as follows.

For example, when the radiation width Bx in the direction parallel to the short edges of the irradiated region 141 is reduced, the maximum light ray angle θ of the light that the X-direction zoom condenser lens 136x causes to be incident on the mask 140 increases, as shown in FIGS. 12A and 12B. FIGS. 12A and 12B show the angle corresponding to twice the maximum light ray angle θ.

When the maximum light ray angle changes, the conditions in accordance with which the mask 140 is illuminated change, resulting in an unintended change in processing performance in some cases. When the radiation width of the irradiated region 141 is changed in only one of the direction parallel to the short edges and the direction parallel to the long edges or when the radiation width of the irradiated region 141 is changed in the direction parallel to the short edges and the direction parallel to the long edges separately by different factors, the processing performance in the direction parallel to the short edges differs from the processing performance in the direction parallel to the long edges. For example, when an object is processed by using a circular pattern, the object can be elliptically processed in some cases.

In the fourth embodiment, the enlargement/reduction optical system 170d changes the radiation width of the irradiated region 131 in such a way that an unintended change in the processing performance is suppressed even when the magnification factor of the zoom condenser lens 136a is changed.

The enlargement/reduction optical system 170d is so set that a focal length Fo of the enlargement/reduction optical system 170d is proportional to a focal length Fz of the zoom condenser lens 136a. The focal length Fo of the enlargement/reduction optical system 170d is set as follows:

A magnification factor Mo of the enlargement/reduction optical system 170d is first calculated based on Expression (10) below.

$$Fz/Fz\ min = Mo/Mz\ min \tag{10}$$

Fz is the focal length of the zoom condenser lens 136a.

Fzmin is the focal length of the zoom condenser lens 136a in a case where the radiation width of the laser light irradiated region 141 of the mask 140 is minimized.

Mzmin is the magnification factor of the zoom condenser lens 136a in the case where the radiation width of the laser light irradiated region 141 of the mask 140 is minimized.

The focal length Fo of the enlargement/reduction optical system 170d is then calculated based on Expression (11) below.

$$Fo = Mo \cdot Fo\text{min} \tag{11}$$

Fomin is the focal length of the enlargement/reduction optical system 170d in a case where the radiation width of the laser light irradiated region 131 of the fly-eye lens 134 is minimized.

The position of each of the three cylindrical lenses that form the enlargement/reduction optical system 170d is determined based on the calculated focal length Fo.

When the first and second optical systems described above are both disposed as the enlargement/reduction optical system 170d, the focal lengths Fo of the enlargement/reduction optical system 170d are set separately in the axis-X and axis-Y directions.

5.3 Effects

According to the fourth embodiment, the enlargement/reduction optical system 170d is adjusted in conjunction with the adjustment of the zoom condenser lens 136a. An unintended change in the processing performance is thus suppressed even when the magnification factor of the zoom condenser lens 136a is changed.

6. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A laser processing apparatus comprising:
a placement base on which a workpiece is placed;
a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of causing one of a first radiation width of the first irradiated region in a direction parallel to the short edges and a second radiation width of the first irradiated region in a direction parallel to the long edges to be fixed and causing another of the first and second radiation widths to be changed;
a projection optical system configured to project a pattern on the mask onto the workpiece placed on the placement base;
a mover configured to move the first irradiated region at least in the direction parallel to the short edges to move a second irradiated region of the workpiece placed on the placement base that is a region irradiated with the laser light; and
a controller, wherein
the beam shaping optical system is configured to be capable of causing the second radiation width to be fixed and causing the first radiation width to be changed,
the controller is configured to control the beam shaping optical system in such a way that fluence of the laser light on the workpiece placed on the placement base approaches a target value by changing the first radiation width,
the laser light is pulsed laser light, and
the controller is configured to control the mover in such a way that an absolute value of a moving speed Vxm of the first irradiated region in the direction parallel to the short edges approaches a value below, $$|Vxm| = f \cdot Bx/Np,$$

where f represents a repetitive frequency of the pulsed laser light, Bx represents the first radiation width, and Np represents the number of pulses radiated to the same position.

2. The laser processing apparatus according to claim 1, wherein the beam shaping optical system includes
a fly-eye lens, and
a zoom lens that the laser light having passed through the fly-eye lens enters.

3. The laser processing apparatus according to claim 2, wherein the zoom lens includes three cylindrical lenses.

4. The laser processing apparatus according to claim 2, further comprising an enlargement/reduction optical system configured to change a size of a third irradiated region of the fly-eye lens that is a region irradiated with the laser light.

5. The laser processing apparatus according to claim 4, wherein the controller is configured to
control the enlargement/reduction optical system to reduce the third irradiated region when controlling the beam shaping optical system to reduce the first irradiated region, and
control the enlargement/reduction optical system to enlarge the third irradiated region when controlling the beam shaping optical system to enlarge the first irradiated region.

6. A laser processing apparatus comprising:
a placement base on which a workpiece is placed;
a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of independently changing a first radiation width of the first irradiated region in a direction parallel to the short edges and a second radiation width of the first irradiated region in a direction parallel to the long edges;
a projection optical system configured to project a pattern on the mask onto the workpiece placed on the placement base;

a mover configured to move the first irradiated region at least in the direction parallel to the short edges to move a second irradiated region of the workpiece placed on the placement base that is a region irradiated with the laser light; and a controller, wherein the controller is configured to control the beam shaping optical system in such a way that fluence of the laser light on the workpiece placed on the placement base approaches a target value by changing the first radiation width, the laser light is pulsed laser light, and the controller is configured to control the mover in such a way that an absolute value of a moving speed Vxm of the first irradiated region in the direction parallel to the short edges approaches a value below, $$|Vxm|=f \cdot Bx/Np,$$

where f represents a repetitive frequency of the pulsed laser light, Bx represents the first radiation width, and Np represents the number of pulses radiated to the same position.

7. The laser processing apparatus according to claim 6, wherein the controller is configured to control the beam shaping optical system in such a way that the second radiation width approaches a width of the mask in the direction parallel to the long edges.

8. The laser processing apparatus according to claim 6, wherein the controller is configured to control the beam shaping optical system in such a way that the second radiation width is smaller than a width of the mask in the direction parallel to the long edges, and control the mover to, after moving the first irradiated region in the direction parallel to the short edges, move the first irradiated region in the direction parallel to the long edges and then move the first irradiated region in the direction parallel to the short edges.

9. The laser processing apparatus according to claim 6, wherein the beam shaping optical system includes a fly-eye lens, and a zoom lens that the laser light having passed through the fly-eye lens enters.

10. A method for processing a workpiece, the method using a laser processing apparatus including a placement base on which a workpiece is placed, a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of causing one of a first radiation width of the first irradiated region in a direction parallel to the short edges and a second radiation width of the first irradiated region in a direction parallel to the long edges to be fixed and causing another of the first and second radiation widths to be changed, a projection optical system configured to project a pattern on the mask onto the workpiece placed on the placement base, a mover configured to move the first irradiated region at least in the direction parallel to the short edges to move a second irradiated region of the workpiece placed on the placement base that is a region irradiated with the laser light, and a controller, the method comprising shaping the laser light in such a way that the first irradiated region has the rectangular shape;

projecting a pattern on the mask onto the workpiece placed on the placement base; and moving the first irradiated region at least in the direction parallel to the short edges, wherein the beam shaping optical system is configured to be capable of causing the second radiation width to be fixed and causing the first radiation width to be changed, the controller is configured to control the beam shaping optical system in such a way that fluence of the laser light on the workpiece placed on the placement base approaches a target value by changing the first radiation width, the laser light is pulsed laser light, and the controller is configured to control the mover in such a way that an absolute value of a moving speed Vxm of the first irradiated region in the direction parallel to the short edges approaches a value below, $$|Vxm|=f \cdot Bx/Np,$$

where f represents a repetitive frequency of the pulsed laser light, Bx represents the first radiation width, and Np represents the number of pulses radiated to the same position.

11. A method for processing a workpiece, the method using a laser processing apparatus including a placement base on which a workpiece is placed, a beam shaping optical system configured to shape laser light in such a way that a first irradiated region of a mask configured to block part of the laser light that is a region irradiated with the laser light has a rectangular shape having short edges and long edges, the beam shaping optical system further configured to be capable of independently changing a first radiation width of the first irradiated region in a direction parallel to the short edges and a second radiation width of the first irradiated region in a direction parallel to the long edges, a projection optical system configured to project a pattern on the mask onto the workpiece placed on the placement base, a mover configured to move the first irradiated region at least in the direction parallel to the short edges to move a second irradiated region of the workpiece placed on the placement base that is a region irradiated with the laser light, and a controller, the method comprising shaping the laser light in such a way that the first irradiated region has the rectangular shape;

projecting a pattern on the mask onto the workpiece placed on the placement base; and moving the first irradiated region at least in the direction parallel to the short edges, wherein the controller is configured to control the beam shaping optical system in such a way that fluence of the laser light on the workpiece placed on the placement base approaches a target value by changing the first radiation width, the laser light is pulsed laser light, and the controller is configured to control the mover in such a way that an absolute value of a moving speed Vxm of the first irradiated region in the direction parallel to the short edges approaches a value below, $$|Vxm|=f \cdot Bx/Np,$$

where f represents a repetitive frequency of the pulsed laser light, Bx represents the first radiation width, and Np represents the number of pulses radiated to the same position.

* * * * *